US012560178B2

(12) United States Patent (10) Patent No.: US 12,560,178 B2
Raju et al. (45) Date of Patent: Feb. 24, 2026

(54) METHODS, SYSTEMS, AND APPARATUS TO CONTROL A FLUID PROVIDED TO COMPONENTS IN A FLUID PUMP OF A CLOSED LOOP SYSTEM

(71) Applicant: General Electric Company, Schenectady, NY (US)

(72) Inventors: Mohan Kannaiah Raju, Bengaluru (IN); Kudum Shinde, Bengaluru (IN); Ravindra Shankar Ganiger, Bengaluru (IN); Narendra Hardikar, Bengaluru (IN); Michael Joseph Murray, Wyoming, OH (US)

(73) Assignee: General Electric Company, Evendale, OH (US)

( * ) Notice: Subject to any disclaimer, the term of this patent is extended or adjusted under 35 U.S.C. 154(b) by 312 days.

(21) Appl. No.: 18/167,723

(22) Filed: Feb. 10, 2023

(65) Prior Publication Data

US 2024/0209778 A1 Jun. 27, 2024

(30) Foreign Application Priority Data

Dec. 26, 2022 (IN) .............................. 202211075610

(51) Int. Cl.
| | |
|---|---|
| *F04D 29/58* | (2006.01) |
| *F02C 7/32* | (2006.01) |
| *F04D 15/00* | (2006.01) |
| *F04D 17/10* | (2006.01) |
| *F04D 25/06* | (2006.01) |
| *F04D 29/06* | (2006.01) |

(52) U.S. Cl.
CPC ..... *F04D 29/5873* (2013.01); *F04D 15/0005* (2013.01); *F04D 15/0011* (2013.01);
(Continued)

(58) Field of Classification Search
CPC ............. F04D 15/0005; F04D 15/0011; F04D 15/0088; F04D 17/10; F04D 25/0606;
(Continued)

(56) References Cited

U.S. PATENT DOCUMENTS

| | | | |
|---|---|---|---|
| 5,755,559 | A | 5/1998 | Allington et al. |
| 6,047,541 | A | 4/2000 | Hampsten |
| | | (Continued) | |

FOREIGN PATENT DOCUMENTS

| | | |
|---|---|---|
| CN | 110053789 A | 7/2019 |
| CN | 110979748 A | 4/2020 |
| WO | WO-2014158329 A1 * 10/2014 .............. F25B 1/053 |

OTHER PUBLICATIONS

European Patent Office, "Extended European Search Report," issued in connection with European Patent Application No. 23180472.5, mailed on Dec. 13, 2023, 11 pages.
(Continued)

*Primary Examiner* — Charles G Freay
(74) *Attorney, Agent, or Firm* — Hanley, Flight & Zimmerman, LLC

(57) ABSTRACT

Methods, systems, and apparatus are disclosed to provide a pressurized fluid to components of a fluid pump. An example flow control system to provide a pressurized lubricant to a secondary flow network disposed within a fluid pump includes sensors to measure parameters of a fluid corresponding to fluid flow; a recirculation loop fluidly coupled to a secondary inlet of the pump, the recirculation loop to provide a first flowpath, wherein the secondary inlet is an inlet to the secondary flow network; a bypass circuit fluidly coupled to the secondary inlet to provide a second flowpath; and a controller to direct the fluid flow to the first flowpath or the second flowpath based on sensor data from the sensor, the sensor data indicative of a state of the fluid.

18 Claims, 14 Drawing Sheets

(52) U.S. Cl.
 CPC ......... *F04D 15/0088* (2013.01); *F04D 17/10* (2013.01); *F04D 25/0606* (2013.01); *F04D 29/061* (2013.01); *F04D 29/5866* (2013.01); *F04D 29/588* (2013.01); *F02C 7/32* (2013.01); *F04B 2205/00* (2013.01); *F05D 2210/14* (2013.01); *F05D 2260/232* (2013.01)

(58) Field of Classification Search
 CPC ............. F04D 29/5873; F04D 29/5866; F04D 29/588; F04D 29/5806; F04D 7/06; F05D 2210/14; F05D 2260/14; F05D 2260/232; F04B 49/24; F04B 53/18
 See application file for complete search history.

(56) References Cited

U.S. PATENT DOCUMENTS

| | | | | |
|---|---|---|---|---|
| 7,193,341 | B2 * | 3/2007 | Bosen | ..................... F04D 25/06 |
| | | | | 310/58 |
| 10,794,274 | B2 | 10/2020 | Itoh et al. | |
| 11,225,905 | B1 | 1/2022 | Holley et al. | |
| 11,891,998 | B2 | 2/2024 | Yamarthi et al. | |
| 12,000,406 | B2 | 6/2024 | Yamarthi et al. | |
| 2006/0073041 | A1 * | 4/2006 | Goshi | ................... F04D 29/061 |
| | | | | 417/423.7 |
| 2017/0254229 | A1 | 9/2017 | Fletcher | |
| 2019/0128189 | A1 | 5/2019 | Rambo | |
| 2020/0224557 | A1 | 7/2020 | McAuliffe et al. | |
| 2022/0056896 | A1 | 2/2022 | Chang et al. | |
| 2022/0307419 | A1 * | 9/2022 | Wolfe | ....................... F01P 1/00 |
| 2023/0358235 | A1 | 11/2023 | Yamarthi et al. | |
| 2023/0358237 | A1 | 11/2023 | Yamarthi et al. | |
| 2023/0358242 | A1 | 11/2023 | Yamarthi et al. | |
| 2023/0358247 | A1 | 11/2023 | Yamarthi et al. | |
| 2023/0358255 | A1 | 11/2023 | Yamarthi et al. | |
| 2024/0309882 | A1 | 9/2024 | Yamarthi et al. | |

OTHER PUBLICATIONS

European Patent Office, "Communication under Rule 71(3) EPC," issued in connection with European Patent Application No. 23180472. 5, dated Jun. 23, 2025, 9 pages.

* cited by examiner

FROM SENSOR(S) 818, 818A

CONTROLLER 816

INTERFACE CIRCUITRY 904

DATABASE 906

FLUID STATE DATA 908

SUPERCRITICAL
THRESHOLD(S) 912

FLOW MONITOR CIRCUITRY 910

FLOW ROUTE
MANAGER CIRCUITRY 914

TO VALVE ACTUATOR(S) 814A,
822A, 1204A, 1206A, 1304A, 1306A,
HEATER ACTUATOR(S) 826A, ETC.

1500 —

METHODS, SYSTEMS, AND APPARATUS TO CONTROL A FLUID PROVIDED TO COMPONENTS IN A FLUID PUMP OF A CLOSED LOOP SYSTEM

CROSS-REFERENCE TO RELATED APPLICATION

This patent claims benefit to Indian Provisional Patent Application No. 202211075610, which was filed on Dec. 26, 2022, and which is hereby incorporated herein by reference in its entirety. Priority to Indian Provisional Patent Application No. 202211075610 is hereby claimed.

FIELD OF THE DISCLOSURE

This disclosure relates generally to fluid pumps and, more particularly, to methods, systems, and apparatus to control a fluid provided to components in a fluid pump of a closed loop system.

BACKGROUND

Aircraft typically include various accessory systems supporting operation of the aircraft(s) and/or its gas turbine engine(s), such as (but not limited to) a lubrication system that lubricates components of the engine(s), an engine cooling system that provides cooling air to engine components, an environmental control system that provides cooled air to the cabin of the aircraft(s), and/or the like. Such aircraft may include a thermal management system to add or remove heat from a fluid (e.g., oil, air, etc.) during operation of these accessory systems. The thermal management system can include a pump to drive a heat transfer fluid through heat exchangers such that heat is added to and/or removed from the heat exchange fluid.

BRIEF DESCRIPTION OF THE DRAWINGS

In general, the same reference numbers will be used throughout the drawing(s) and accompanying written description to refer to the same or like parts. The figures are not to scale.

DETAILED DESCRIPTION

Figure 1:
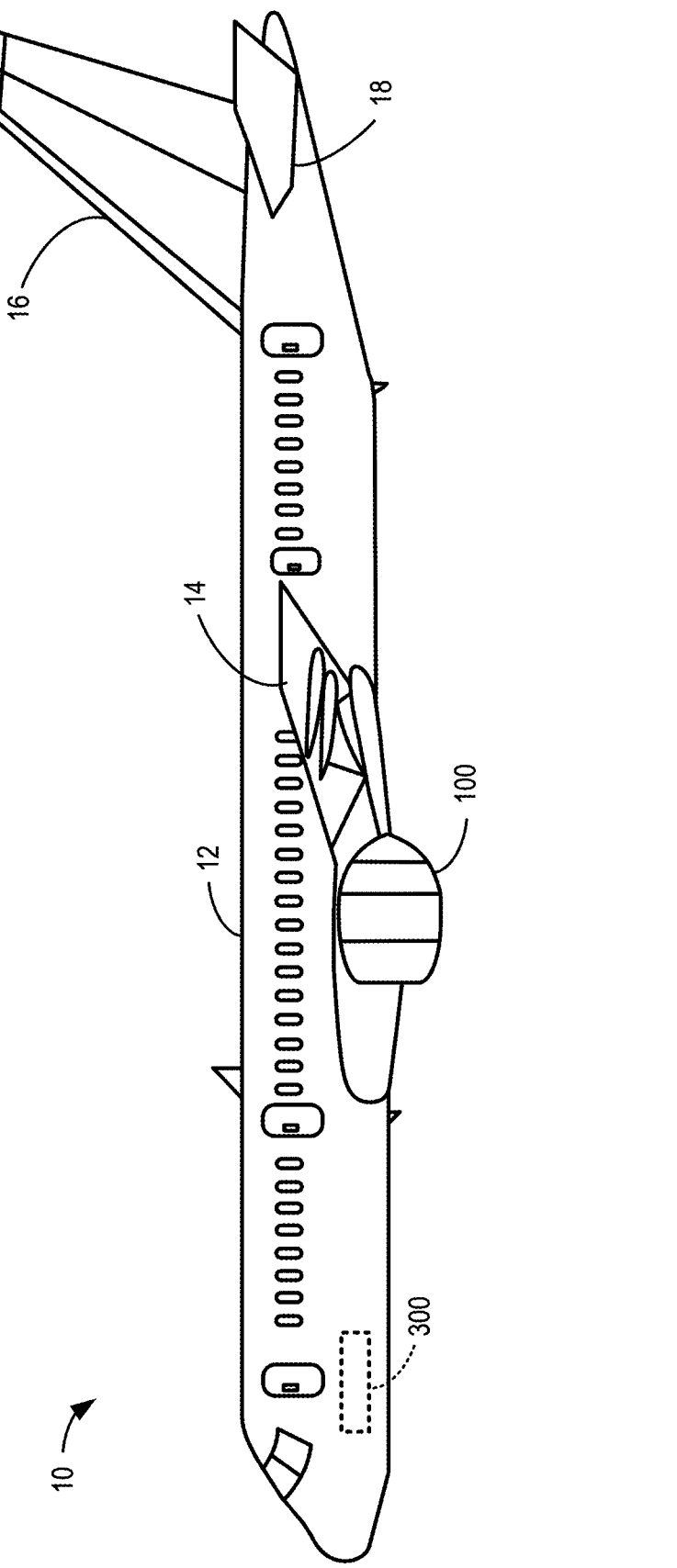
FIG. 1 is a side view of an example aircraft.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As used herein, "radially" is used to express a point or points along a radial vector originating at a central axis of a rotating body and pointing perpendicularly outward from the central axis.

As used herein, in the context of describing the position and/or orientation of a first object relative to a second object, the term "substantially orthogonal" encompasses the term orthogonal and more broadly encompasses a meaning whereby the first object is positioned and/or oriented relative to the second object at an absolute angle of no more than five degrees (5°) from orthogonal. For example, a bearing that is substantially orthogonal to an axis is positioned and/or oriented relative to the axis at an absolute angle of no more than five degrees (5°) from orthogonal.

As used herein, in the context of describing actuation of a valve, the term "actuate" refers to opening or closing the valve and/or a port thereof. As used herein, in the context of describing a valve, the terms "open" and "close" encompass the action of opening or closing, respectively, the valve and/or the port thereof and more broadly encompasses a condition (e.g., opened or closed, respectively) of the valve and/or the port thereof which results from the action(s). To close a valve is to position a valve such that fluid is prevented from flowing through the valve. As used herein, in the context of describing the valve and/or the port thereof, the term "open" encompasses a number of discrete positions such that fluid can flow through the valve (e.g., fully opened, partially opened, etc.) and/or the port thereof. In some examples, the open valve is dynamic such that the valve can move between the discrete positions (e.g., based on a condition of the fluid, etc.) to control thermal fluid pressure.

As used herein, in the context of describing a state of a fluid (e.g., fluid carbon dioxide), the term "supercritical" and "supercritical state" describe a supercritical state whereby the fluid is at or above a critical temperature and critical pressure. In some examples, a fluid in a substantially super-critical state (e.g., whereby the fluid is at or within 5% of the critical temperature and at or within 5% of the critical pressure) and/or a near-supercritical state (e.g., whereby the fluid is within a 5% range of a critical temperature and/or within a 5% range of a critical pressure) are treated as a supercritical fluid in view of diminishing returns of causing a fluid to move to a fully supercritical state.

The terms "state" and "phase" are used below to describe a form of matter (e.g., carbon dioxide). A state of matter refers to a form of matter at a given temperature and a pressure. A phase of matter refers to a set of equilibrium states demarcated in terms of state variables such as pressure and temperature. As discussed herein, the terms state and phase are used interchangeable to describe a form of a given portion of matter at a given moment. At a given temperature and pressure, a substance can exist mainly in one of four major states/phases of matter: solid, liquid, gas, and super-critical fluid. The term "non-liquid fluid" is used below to describe matter that is not in a liquid state/phase or a solid state/phase.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of pro-cesses, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, the phrase "in communication," including variations thereof, encompasses direct communication and/or indirect communication through one or more intermedi-ary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

Aircraft often include a thermal management system to transfer heat to/from accessory systems of a gas turbine engine. The thermal management system may include a fluid pump coupled to one or more heat exchangers via a thermal transport bus (e.g., a conduit, flowpath, etc.). The fluid pump drives a fluid (e.g., a heat transfer fluid, a working fluid such as fuel, oil, air, supercritical carbon dioxide, etc.) between the accessory systems and/or engine components. During operation of the thermal transport system, the heat transfer fluid can absorb heat from a heat source(s) and/or transfer heat to a heat sink(s) such that the fluid absorbs heat from and/or transfers heat to the systems and/or components.

In some examples, the fluid pump is a centrifugal fluid pump that moves the fluid by converting rotational kinetic energy of an impeller to hydrodynamic energy of a flowing fluid. The impeller is provided a change in rotational kinetic energy from an electric motor applying mechanical work to an impeller shaft coupled to the impeller and to a rotor (e.g., motor shaft) of the electric motor. The rotor can be coupled to the impeller shaft axially (e.g., via a magnetic coupling) or radially (e.g., via a gearing assembly, etc.). The rotor is provided a change in mechanical work over a period of time (i.e., mechanical power) from a stator in the electric motor applying electromagnetic forces to the rotor in the form of torque. In other words, the torque and angular velocity of the rotor is transferred to the impeller shaft, and ultimately, to the impeller, which draws the heat exchange fluid into an inlet and accelerates the heat exchange fluid radially outward into an outlet.

The centrifugal fluid pump typically includes one or more bearings (e.g., radial bearings and/or thrust bearings) to support a load applied by the rotor, the impeller shaft, and/or another component of the fluid pump. Bearings constrain relative motion of a shaft(s) to an axis of rotation defined by the shaft, enabling free motion of the shaft about the axis rotation. The load can be applied to the bearing in a radial direction (e.g., orthogonal to the bearing's axis of rotation) or an axial direction (e.g., a thrust acts parallel to the bearing's axis of rotation). For example, the thrust bearing may include a foil bearing positioned around a thrust disc to prevent or otherwise reduce axial movement of the shaft.

Centrifugal fluid pumps in high pressure applications (e.g., aircrafts, gas turbine engines, etc.) often include fluid bearings (e.g., foil bearings, journal bearings, etc.), which are non-contact bearings that rely on a pressurized fluid to support the load and reduce friction. In some examples, the centrifugal fluid pumps implement closed loop systems in which the heat exchange fluid flowing through the pump is contained in a system of conduits (e.g., a conduit system, a pipeline system, flowpath(s), flowline(s), etc.) that prevent other fluids from transferring into or out of the system of conduits. In some examples, the centrifugal fluid pump includes a recirculation loop (e.g., a recirculation circuit, a secondary system, a lubrication system, etc.) that is configured to provide at least a portion of a working fluid to internal components of the fluid pump. For example, the centrifugal fluid pump can include a primary flow network (e.g., loop, flowline(s), etc.) to drive the heat exchange fluid to the thermal transport bus to support an operation of the aircraft and a secondary flow network (e.g., loop, flowline(s), etc.) to drive the heat exchange fluid through the fluid pump to lubricate the fluid bearings (e.g., radial bearings, thrust bearings, etc.) and reduce frictional forces between rotating elements within those bearings. The primary flow network may include conduits fluidly coupled to the thermal transport bus. The secondary flow network may include a flowpath(s) and/or flowline(s) within the pump to allow pressurized fluid to flow through the fluid bearings and/or other internal components of the pump.

The recirculation loop can include a recirculation transport bus (e.g., secondary conduit, flowline, duct, etc.) fluidly coupled to the secondary flow network via a secondary inlet of the fluid pump. In some examples, the recirculation transport bus is fluidly coupled between an outlet of the pump (e.g., directly to the outlet or to a portion of the thermal transport bus extending from the outlet) and the secondary inlet of the pump. Thus, the centrifugal fluid pump may be configured to tap a portion of the heat exchange fluid flowing from the outlet of the pump to provide pressurized fluid to the secondary flow network to support the fluid bearings and/or other rotating components of the pump (e.g., the impeller).

In some examples, the pump can include expeller vanes to drive the heat exchange fluid from internal portions of a pump housing to the pump outlet. In some examples, expeller vanes protrude from an aft side of the impeller and function similarly to impeller vanes. That is, the heat exchange fluid approaches the expeller vanes along a central axis and accelerates radially outward from the expeller vanes. Thus, the secondary flow network and the expeller vanes can implement a lubricating circuit from the pump outlet to the fluid bearing(s) and back to the expeller vanes to provide a continuous flow of the fluid to the load bearings.

During operation of the pump, axial thrust of the impeller shaft can act in forward or aft directions based on interactions between the impeller vanes/expeller vanes and the fluid. The heat exchange fluid enters through a primary inlet of the pump along a central/rotating/shaft axis toward the impeller, which includes the impeller vanes to accelerate the fluid radially outward into a pump outlet. Fluid pressure on a forward portion of the impeller can transfer aft axial loads to the impeller shaft in the aft direction. Similarly, a portion of the fluid that enters the secondary inlets flows forward along the axis of rotation of the impeller shaft and builds up pressure on an aft portion of the impeller (e.g., the expeller). Fluid pressure on the aft portion of the impeller can transfer forward loads to the impeller shaft in the forward direction. When the forward and aft axial loads are of equal values and act in opposite directions, the pump is said to be "thrust balanced." Accordingly, the second flow network can provide thrust balance for the impeller of the centrifugal fluid pump.

In some examples, the thermal management system uses supercritical, carbon dioxide (e.g., sCO2) as the heat exchange fluid due to its low viscosity and high specific heat, which makes sCO2 more thermally conductive than other heat exchange fluids (e.g., water, air, etc.). Supercritical carbon dioxide is carbon dioxide held at or above a critical temperature and a critical pressure, allowing it to take on properties of a gas and a liquid, resulting in a low (e.g., gas-like) viscosity and high (fluid-like) density. In some examples, the thermal management system uses supercritical carbon dioxide, substantially supercritical carbon dioxide and/or near-supercritical carbon dioxide as the heat exchange fluid. In some examples, the thermal management system uses non-liquid fluid carbon dioxide as the heat exchange fluid.

Performance of the centrifugal fluid pump and/or components therefore may increase when working carbon dioxide is in a supercritical phase and/or another non-liquid fluid phase, and decreases when working carbon dioxide is in a liquid phase. For example, a presence of liquid carbon dioxide flowing around a non-liquid fluid bearing may adversely affect performance of the bearing and, in turn, the fluid pump. In some examples, the presence of liquid carbon dioxide may result in viscous draft (e.g., hydrodynamic drag, windage loss, etc.), issues with film thickness/stiffness, etc. Viscous drag refers to a reduction in efficiency due to a drag forces (e.g., friction) between a liquid and a surface (the shaft, the bearing, a housing supporting the bearing, etc.), which decreases fluid velocity relative to the surface. Non-liquid fluid bearings can utilize a thin film of pressurized fluid (e.g., a non-liquid fluid) to provide a low friction load-bearing interface (e.g., a bearing clearance) between surfaces of the fluid pump (e.g., a shaft and a rotor). Bearing failure can result from a breakdown in film (e.g., a reduction in bearing clearance) separating the rotating component from the non-rotating component. In some examples, a small change in the film thickness can result in a comparatively large reduction in a load carrying capacity of the non-liquid fluid bearing.

Example methods, systems, and apparatus are disclosed herein provide control of a fluid flow to be provided to a rotating component (e.g., a fluid bearing, an impeller, etc.) of a fluid pump in a closed loop or semi-closed fluid system. Disclosed examples may be applied to a thermal management system that uses a heat transfer fluid to transfer thermal energy between heat exchangers (e.g., a heat source heat exchanger and/or heat sink heat exchanger). Disclosed examples may be applied to a closed loop centrifugal fluid pump that provides a pressurized fluid to a thermal transport bus via a primary flow network and to operational components of the pump via a secondary flow network within the pump. In some examples, the heat transfer fluid is a supercritical fluid.

Examples disclosed herein may be applied to a fluid pump that utilizes supercritical carbon dioxide (sCO2) as a working fluid (e.g., an sCO2 pump). The sCO2 pump may be used to implement an advanced Brayton cycle, which is a supercritical recompression thermodynamic cycle based on a working fluid (e.g., sCO2, etc.). The unique properties of sCO2 present advantages for closed-loop power generation, such as those described herein, and can be applied to various power generation applications increase efficiency and power output.

Examples disclosed herein enable manufacture of an example flow control system for a secondary (e.g., recirculation) loop of a closed loop fluid pump. In some examples, the recirculation loop includes an example secondary flow network defined by a flowpath(s) through operational components of the fluid pump and an example recirculation transport bus that defines an example secondary flowpath from an outlet of the fluid pump to a secondary inlet of the fluid pump that leads to the secondary flow network. Example secondary flow control systems disclosed herein are configured to prevent or otherwise limit liquid carbon dioxide from entering the secondary flow network. Disclosed examples may be coupled or otherwise integrated with recirculation loops of centrifugal pumps.

Example secondary flow control systems disclosed herein include one or more sensors to detect a temperature(s) and pressure(s) of fluid carbon dioxide relative to the recirculation loop during operation of the centrifugal fluid pump. For example, one or more sensors may be positioned relative to an inlet and/or outlet of the centrifugal fluid pump such that temperature and pressure measurements of fluid carbon dioxide can be obtained prior to entrance to a secondary flowpath leading to the secondary flow network. In some examples, the secondary flowpath is defined by a conduit (e.g., a recirculation transport bus, duct, pipe, etc.) fluidly coupled between an outlet of the fluid pump and a secondary inlet of the fluid pump that defines an inlet of the secondary flow network.

Certain examples include a controller (e.g., controller circuitry, etc.) to control components of the flow control system. In some examples, the controller can determine a state of fluid carbon dioxide based on sensor data from the one or more sensors. For example, the state of fluid carbon dioxide can be determined based on a measured temperature and a measured pressure of the fluid carbon dioxide (e.g., based on a temperature-pressure phase diagram). Certain examples provide for conversion of liquid carbon dioxide entering the secondary flowpath to a supercritical state such that sCO2 is provided to the secondary flow network rather than the liquid carbon dioxide.

Example secondary flow control systems disclosed herein include one or more valves to direct fluid carbon dioxide entering the secondary flowpath. Based on a phase of fluid carbon dioxide entering the secondary flowpath, the one or more valves may allow the fluid carbon dioxide to flow through the secondary flowpath to the secondary inlet, or may direct the fluid carbon dioxide to an example bypass (e.g., conversion) flowpath defined by an example bypass conduit (e.g., flowline, pipe, duct, etc.). For example, the flow control system may cause detected sCO2 to flow through the secondary flowpath directly to the secondary flow network while causing detected liquid CO2 to flow through the bypass flowpath. Certain examples drive liquid CO2 entering the bypath flowpath towards a pressure tank(s), a heater(s), a pressure valve(s), a thermal valve(s), etc. positioned along the bypass flowpath to transform the liquid CO2 into sCO2. Upon reaching the supercritical phase, certain example secondary flow control systems allow the sCO2 to return to the secondary flowpath to be provided to the secondary flow network and/or stored in a pressure tank for future use.

During operation, the centrifugal fluid pump may reach a steady state at which heat applied from components of the thermal management system is sufficient to convert liquid carbon dioxide to a supercritical state. However, while the pump is powered down, a temperature and/or pressure of working carbon dioxide may reduce, transforming sCO2 to liquid form. Accordingly, liquid carbon dioxide is often present in the central fluid pump during start-up of the pump (e.g., of the aircraft/engine). Certain examples may help ensure that fluid carbon dioxide that enters into the secondary flow network is in a supercritical phase rather than in a liquid phase to improve performance of a bearing(s) in the fluid pump. Certain examples may help ensure that liquid carbon dioxide inside the fluid pump (e.g., during operation, during start-up, etc.) does not enter an inlet of an impeller. Certain examples may improve reliability of foil bearings in a fluid pump.

Examples are disclosed below in relation to a different types of centrifugal fluid pumps. However, in alternative examples, the fluid pumps may vary in number and/or type. For example, disclosed examples can be applied to applications for which a fluid state change may be needed during engine startup. While examples disclosed herein are applied to fluid pumps having fluid carbon dioxide as the working fluid, disclosed examples can be applied to other systems having other types of working fluids in additional or alternative examples such that the systems can achieve a critical temperature of the working fluid and the working fluid is associated with a critical pressure below a maximum pressure of the systems. For example, the working fluid can be nitrogen and/or other fluids for which a critical point to be achieved is reasonable in view of a given application.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

Referring now to the drawings, wherein identical numerals indicate the same elements throughout the figures, FIG. 1 is a side view of one embodiment of an aircraft 10 that may implement the examples disclosed herein. As shown, in several embodiments, the aircraft 10 includes a fuselage 12 and a pair of wings 14 (one is shown) extending outward from the fuselage 12. In the illustrated embodiment, a gas turbine engine 100 is supported on each wing 14 to propel the aircraft through the air during flight. Additionally, as shown, the aircraft 10 includes a vertical stabilizer 16 and a pair of horizontal stabilizers 18 (one is shown). However, in alternative embodiments, the aircraft 10 may include any other suitable configuration, such as any other suitable number or type of engines.

Furthermore, the aircraft 10 may include a thermal management system 300 for transferring heat between fluids supporting the operation of the aircraft 10. More specifically, the aircraft 10 may include one or more accessory systems configured to support the operation of the aircraft 10. For example, in some examples, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 300 is configured to transfer heat to and/or from one or more fluids supporting the operation of the aircraft 10 (e.g., the oil of the lubrication system, the air of the cooling system and/or the environmental control system, and/or the like) from and/or to one or more other fluids supporting the operation of the aircraft 10 (e.g., the fuel supplied to the engines 100). However, in alternative examples, the thermal management system 300 may be configured to transfer heat between any other suitable fluids supporting the operation of the aircraft 10. Further, the configuration of the aircraft 10 described above and shown in FIG. 1 is provided only to place the present subject matter in an exemplary field of use. Thus, the present subject matter may be readily adaptable to any manner of aircraft and/or any other suitable heat transfer application.

Figure 2:
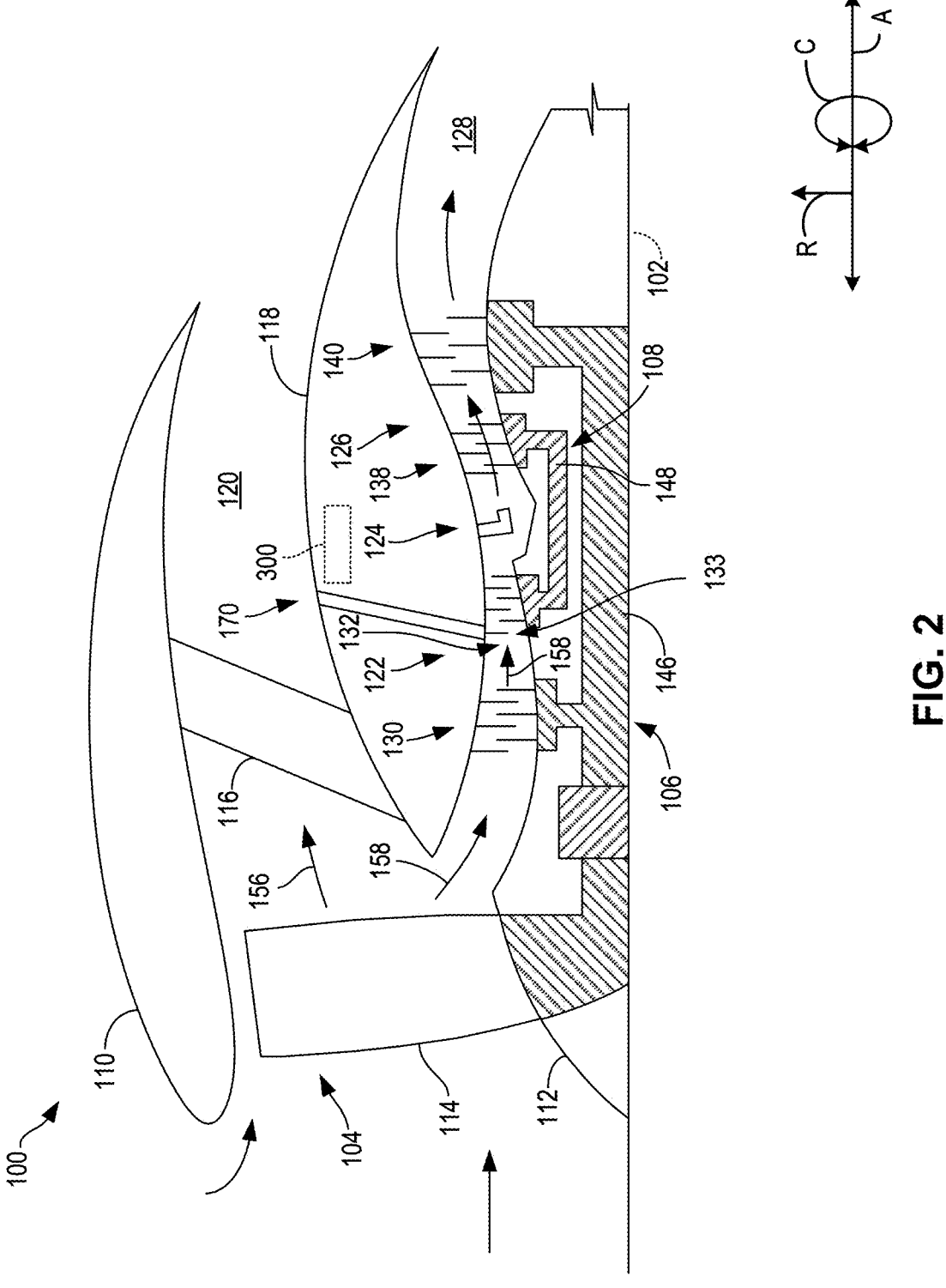
FIG. 2 is a schematic cross-sectional view of an example gas turbine engine of an aircraft.

FIG. 2 is a schematic cross-sectional view of one embodiment of a gas turbine engine 100. In the illustrated example of FIG. 2, the engine 100 extends along an axial centerline 102 and includes a fan 104, a low-pressure (LP) spool 106, and a high pressure (HP) spool 108 at least partially encased by an annular nacelle 110. The fan 104 may include a fan rotor 112 and a plurality of fan blades 114 (one is shown) circumferentially spaced apart and extend radially outward from the fan rotor 112. The LP and HP spools 106, 108 are positioned downstream from the fan 104 along the axial centerline 102. As shown, the LP spool 106 is rotatably coupled to the fan rotor 112, permitting the LP spool 106 to rotate the fan blades 114. A plurality of outlet guide vanes (e.g., struts) 116 extend radially between an outer casing 118 surrounding the LP and HP spools 106, 108 and the nacelle 110. As such, the outlet guide vanes 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. The compressor section 122 may include a low-pressure (LP) compressor 130 of the LP spool 106 and a high-pressure (HP) compressor 132 of the HP spool 108 positioned downstream from the LP compressor 130. The turbine section 126 may include a high-pressure (HP) turbine 138 of the HP spool 108 and a low-pressure (LP) turbine 140 of the LP spool 106 positioned downstream from the HP turbine 138. Additionally, the LP spool 106 includes a low-pressure (LP) shaft 146 and the HP spool 108 includes a high pressure (HP) shaft 148 positioned concentrically around the LP shaft 146.

As mentioned above, the aircraft 10 may include a thermal management system 300 for transferring heat between fluids supporting the operation of the aircraft 10. In this respect, the thermal management system 300 may be positioned within the engine 100. For example, as shown in FIG. 2, the thermal management system 300 is positioned within the outer casing 118 of the engine 100. However, in alternative examples, the thermal management system 300 may be positioned at any other suitable location within the engine 100.

Furthermore, in some examples, the engine 100 defines a third-stream flow path 170. In general, the third-stream flow path 170 extends from a compressed air flow path 133 defined by the compressor section 122 to the bypass airflow passage 120. In this respect, the third-stream flow path 170 allows a portion of compressed air 158 from the compressor section 122 to bypass the combustion section 124. The third-stream flow path 170 may be configured to selectively remove a portion of compressed air 158 from the compressed air flow path via one or more variable guide vanes, nozzles, or other actuable flow control structures (e.g., a variable bleed valve). In some example, the thermal management system 300 may transfer heat to the air flowing through the third-stream flow path 170.

In the illustrated example, the engine 100 is configured as a high-bypass turbofan engine. However, in alternative embodiments, the engine 100 may be configured as a propfan engine, a turbojet engine, a turboprop engine, a turboshaft gas turbine engine, or any other suitable type of gas turbine engine. The configuration of the gas turbine engine 100 described above and shown in FIG. 2 is provided only to place the present subject matter in an example field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
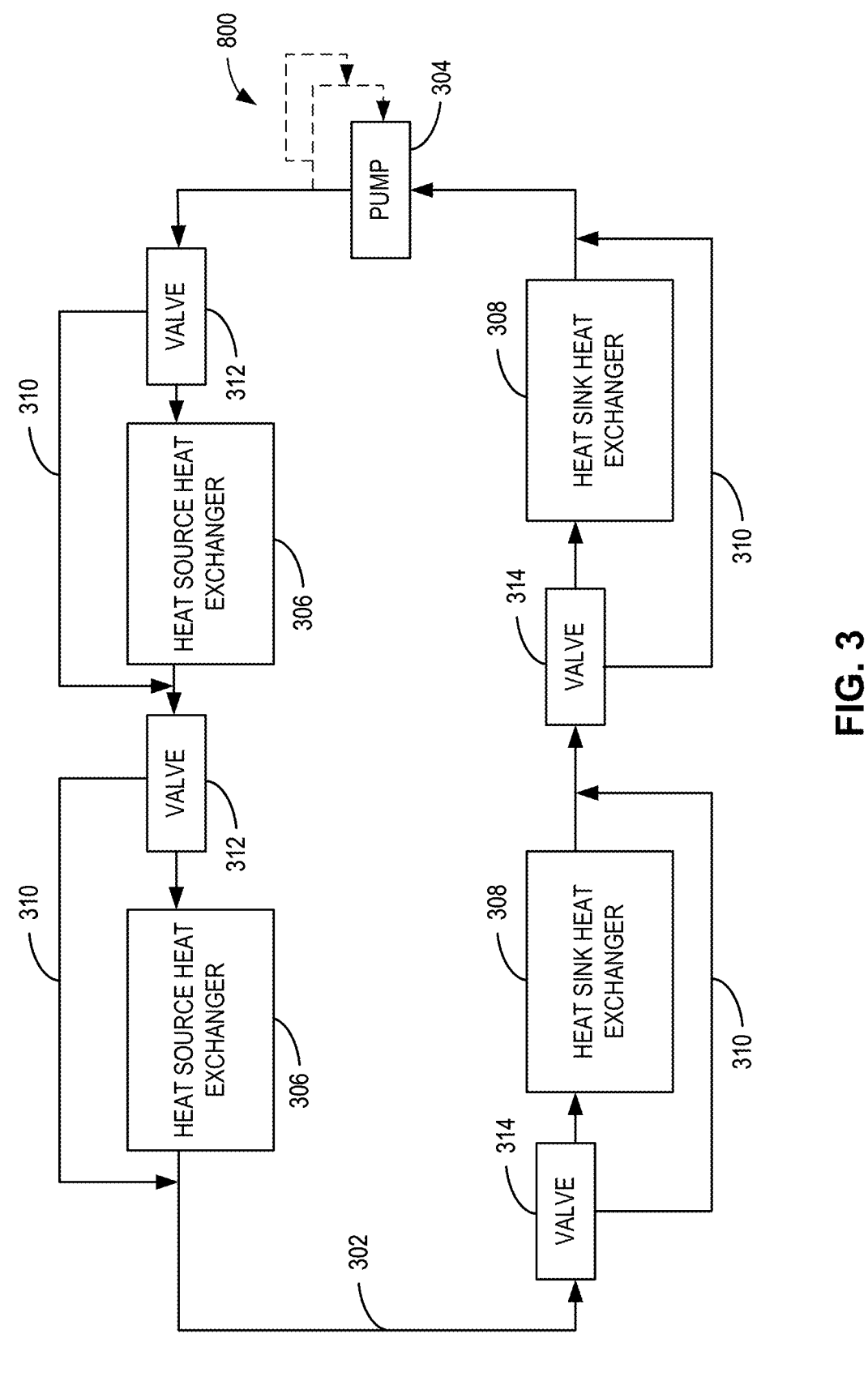
FIG. 3 is a schematic diagram of an example thermal management system for transferring heat between fluids.

FIG. 3 is a schematic view of an example implementation of the thermal management system 300 for transferring heat between fluids. In general, the thermal management system 300 will be discussed in the context of the aircraft 10 and the gas turbine engine 100 described above and shown in FIGS. 1 and 2. However, the disclosed thermal management system 300 may be implemented within any aircraft having any other suitable configuration, any gas turbine engine having any other suitable configuration, and/or other high-pressure applications that utilize a thermal transport system.

As shown, the thermal management system 300 includes a thermal transport bus 302. In some examples, the thermal transport bus 302 defines a primary flowpath. In some examples, the thermal transport bus 302 is configured as one or more fluid conduits through which a fluid (e.g., a heat exchange fluid such as carbon dioxide) flows. As will be described below, the heat exchange fluid flows through various heat exchangers such that heat is added to and/or removed from the heat exchange fluid. In this respect, the heat exchange fluid may be any suitable fluid, such as sCO2. Moreover, in such examples, the thermal management system 300 includes a pump 304 configured to pump the heat exchange fluid through the thermal transport bus 302.

The thermal management system 300 of FIG. 3 includes one or more heat source heat exchangers 306 arranged along the thermal transport bus 302. The heat source heat exchanger(s) 306 is fluidly coupled to the thermal transport bus 302 such that the heat exchange fluid can flow through the heat source heat exchanger(s) 306. In this respect, the heat source heat exchanger(s) 306 is configured to transfer heat from fluids supporting the operation of the aircraft 10 to the heat exchange fluid, thereby cooling the fluids supporting the operation of the aircraft 10. Thus, the heat source heat exchanger(s) 306 adds heat to the heat exchange fluid. Although FIG. 3 illustrates two heat source heat exchangers 306, the thermal management system 300 may include a single heat source heat exchanger 306 or three or more heat source heat exchangers 306.

The heat source heat exchanger(s) 306 may correspond to any suitable heat exchanger(s) that cools a fluid supporting the operation of the aircraft 10. For example, at least of one of the heat source heat exchangers 306 may be a heat exchanger(s) of the lubrication system(s) of the engine(s) 100. In such an example, this heat exchanger(s) 306 transfers heat from the oil lubricating the engine(s) 100 to the heat transfer fluid. In some examples, at least one of the heat source heat exchangers 306 may be a heat exchanger(s) of the cooling system of the engine(s) 100. In such examples, the heat exchanger(s) 306 transfers heat from the cooling air bled from the compressor section(s) 122 (or a compressor discharge plenum) of the engine(s) 100 to the heat transfer fluid. In alternative examples, the heat source heat exchanger(s) 306 may correspond to any other suitable heat exchangers that cool a fluid supporting the operation of the aircraft 10.

Furthermore, the thermal management system 300 of FIG. 3 includes a plurality of heat sink heat exchangers 308 arranged along the thermal transport bus 302. The heat sink heat exchangers 308 are fluidly coupled to the thermal transport bus 302 such that the heat exchange fluid can flow through the heat sink heat exchangers 308. In this respect, the heat sink heat exchangers 308 are configured to transfer heat from the heat exchange fluid to other fluids supporting the operation of the aircraft 10, which heats the other fluids supporting the operation of the aircraft 10. In other words, the heat sink heat exchangers 308 remove heat from the heat exchange fluid. Although FIG. 3 illustrates two heat sink heat exchangers 308, the thermal management system 300 may include three or more heat sink heat exchangers 308.

The heat sink heat exchangers 308 may correspond to any suitable heat exchangers that heat a fluid supporting the operation of the aircraft 10. For example, at least of one of the heat sink heat exchangers 308 is a heat exchanger(s) of the fuel system(s) of the engine(s) 100. In such an example, the fuel system heat exchanger(s) 308 transfers heat from the heat transfer fluid to the fuel supplied to the engine(s) 100. In some examples, at least one of the heat sink heat exchangers 308 may be a heat exchanger(s) in contact with air 156 flowing through the bypass airflow passage(s) 120 of the engine(s) 100. In such an example, the heat exchanger(s) 308 transfers heat from the heat exchange fluid to the air 156 flowing through the bypass airflow passage(s) 120.

In some examples, the thermal management system 300 includes one or more bypass conduits 310. Specifically, as shown, each bypass conduit 310 is fluidly coupled to the thermal transport bus 302 such that the bypass conduit 310 allows at least a portion of the heat exchange fluid to bypass one of the heat exchangers 306, 308. In some examples, the heat exchange fluid bypasses one or more of the heat exchangers 306, 308 to adjust the temperature of the heat exchange fluid within the thermal transport bus 302. The flow of example heat exchange fluid through the bypass conduit(s) 310 can be controlled to regulate the pressure of the heat exchange fluid within the thermal transport bus 302. In the illustrated example of FIG. 3, each heat exchanger 306, 308 has a corresponding bypass conduit 310. However, in alternative examples, any number of heat exchangers 306, 308 may have a corresponding bypass conduit 310.

In some examples, the thermal management system 300 includes one or more heat source valves 312 and one or more heat sink valves 314. In general, each heat source valve 312 is configured to control the flow of the heat exchange fluid through a bypass conduit 310 that bypasses a heat source heat exchanger 306. Similarly, each heat sink valve 314 is configured to control the flow of the heat exchange fluid through a bypass conduit 310 that bypasses a heat sink heat exchanger 308. In this respect, each valve 312, 314 is fluidly coupled to the thermal transport bus 302 and a corresponding bypass conduit 310. As such, each valve 312, 314 may be moved between fully and/or partially opened and/or closed positions to selectively occlude the flow of heat exchange through its corresponding bypass conduit 310.

The valves 312, 314 are controlled based on the pressure of the heat exchange fluid within the thermal transport bus 302. More specifically, in certain instances, the pressure of the heat exchange fluid flowing through the thermal transport bus 302 may fall outside of a desired pressure range.

When the pressure of the heat exchange fluid is too high, the thermal management system 300 may incur accelerated wear. In this respect, when the pressure of the heat exchange fluid within the thermal transport bus 302 exceeds a maximum or otherwise increased pressure value, one or more heat source valves 312 open. In such instances, at least a portion of the heat exchange fluid flows through the bypass conduits 310 instead of the heat source heat exchanger(s) 306. Thus, less heat is added to the heat exchange fluid by the heat source heat exchanger(s) 306, thereby reducing the temperature and, thus, the pressure of the fluid.

The example pump 304 drives the flow of the heat exchange fluid through the thermal management system 300. In some examples, the thermal management system 300 includes one pump 304 or multiple pumps 304 depending on a desired flow rate, delta pressure across the pump 304, and/or the kinetic energy loss of the heat exchange fluid in the thermal transport bus 302. For example, the pump 304 may increase the output pressure head to accelerate the flow of the heat exchange fluid to a first flowrate. As the heat exchange fluid passes through the thermal transport bus 302, the example kinetic energy of the heat exchange fluid dissipates due to friction, temperature variations, etc.

The pump 304 may include an example secondary flow control system 800 for driving pressurized fluid that flows through the thermal transport bus 302 through the pump 304 to lubricate one or more rotating components within the pump 304, such as fluid bearings, an impeller, an impeller shaft, etc. For example, the secondary flow control system 800 may drive sCO2 from an outlet of the pump 304 towards a secondary inlet of the pump 304 that allows the sCO2 to flow around the one or more rotating components. Further, the secondary flow control system 800 may include a bypass flowpath to direct liquid CO2 through a bypass circuit that moves the liquid CO2 to a supercritical state before returning to the secondary flowpath. Example implementations of the example secondary flow control system 800 are described in greater detail below.

Figure 4:
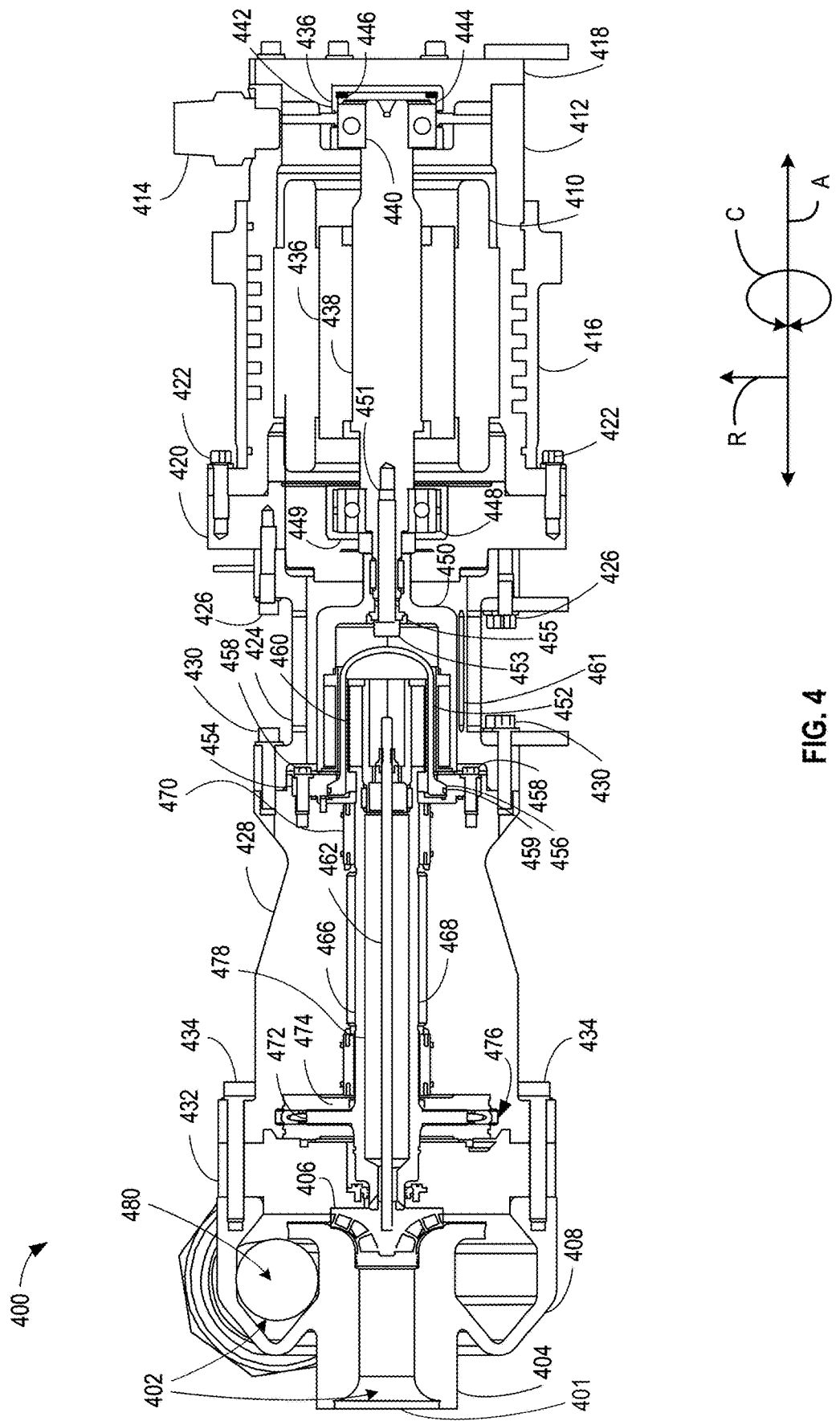
FIGS. 4 and 5 illustrate example thermal transport bus pumps with which disclosed example may be implemented.

FIG. 4 illustrates an example thermal transport bus pump 400 (e.g., a magnetically driven pump, a canned motor pump, a fluid pump, an sCO2 pump, the pump 304 of FIG. 3, etc.) with which disclosed examples may be implemented. In the example of FIG. 4, the thermal transport bus pump 400 drives a heat exchange fluid (e.g., carbon dioxide) through one or more fluid conduits 402 connected to a flowline (e.g., a primary flowpath, the thermal transport bus 302 of FIG. 3). Specifically, the heat exchange fluid flows through an inlet pipe 404 defining a primary inlet 401 and encounters an impeller 406 (e.g., a compressor wheel) that rotates to drive the heat exchange fluid through a compressor collector 408 (e.g., a volute housing, casing, etc.) fluidly coupled to the fluid conduit(s) 402. In turn, the fluid conduit(s) 402 can feed the heat exchange fluid to one or more heat exchangers (e.g., the heat source heat exchanger 306 and/or the heat sink heat exchanger 308 of FIG. 3). Accordingly, the thermal transport bus pump 400 can pump the heat exchange fluid to manage a thermal energy of working fluids associated with the aircraft 10 of FIG. 1, the gas turbine engine 100 of FIG. 2, and/or any other suitable system.

In the illustrated example of FIG. 4, the thermal transport bus pump 400 includes a motor 410 to indirectly drive a rotation of the impeller 406. In FIG. 4, the motor 410 is an induction motor operatively coupled to a variable frequency drive (VFD) (not shown) via a feedthrough connector 414 coupled to a motor housing 412 surrounding the motor 410. The VFD can be operatively coupled to a controller (e.g., controller 816, a full authority digital engine control (FADEC), and/or another control device.), that controls a rotational speed of the motor 410. For example, the controller 816 can operate the motor 410 based on a pressure and/or a temperature of the fluid in the fluid conduit(s) 402 and/or in the thermal transport bus pump 400. In some examples, the controller can operate the motor 410 based on a pressure and/or a temperature of the working fluid(s) affected by the heat exchange fluid. Additionally or alternatively, the controller can operate the motor 410 based on vibration measurements obtained by accelerometers operatively coupled to the thermal transport bus pump 400 and/or the fluid conduit(s) 402.

In FIG. 4, the motor housing 412 is at least partially surrounded by a cooling jacket 416 to prevent the motor 410 from overheating. An aft end of the motor housing 412 is coupled to an aft bearing housing 418. A forward end of the motor housing 412 is coupled to an intermediate bearing housing 420 via bolts 422. The intermediate bearing housing 420 is coupled to a coupling housing 424 opposite the motor housing 412 via bolts 426. The coupling housing 424 is coupled to a forward bearing housing 428 opposite the intermediate bearing housing 420 via bolts 430. The forward bearing housing 428 is coupled to a backplate 432 and the compressor collector 408 on an opposite side of the backplate 432 via bolts 434.

In the illustrated example of FIG. 4, a rotor 436 of the motor 410 is fixedly coupled to a shaft 438. As such, the motor 410 drives a rotation of the shaft 438. An aft end of the shaft 438 is supported by a first roller bearing 440, which is coupled to the aft bearing housing 418 via a first bearing cup 442 and a bearing shim 444 positioned between the first roller bearing 440 and the aft bearing housing 418. In the illustrated example of FIG. 4, a preload spring 446 is positioned between the first bearing cup 442 and the bearing shim 444. Similarly, a forward end of the shaft 438 is supported by a second roller bearing 448 coupled to the intermediate bearing housing 420. Specifically, the second roller bearing 448 is coupled to the intermediate bearing housing 420 via a second bearing cup 449. The first roller bearing 440 and the second roller bearing 448 are packed with oil lubricant(s) (e.g., grease, motor oil, etc.) to reduce a resistance against the rotation of the shaft 438 and reduce wear encountered by the roller bearings 440, 448 as the shaft 438 rotates.

In the illustrated example of FIG. 4, the forward end of the shaft 438 extends at least partially through the intermediate bearing housing 420. An aft end of a first magnetic coupling 450 (e.g., a female magnetic coupling) is positioned around the forward end of the shaft 438. To couple the shaft 438 and the first magnetic coupling 450, a retention bolt 451 is inserted through the aft end of the first magnetic coupling 450 and the forward end of the shaft 438. Specifically, a width of a head 453 of the retention bolt 451 is greater than a width of an orifice 455 in the first magnetic coupling 450 through which the retention bolt 451 extends. As a result, the shaft 438 drives a rotation of the first magnetic coupling 450.

In the illustrated example of FIG. 4, the first magnetic coupling 450 is positioned around a barrier can 452 (e.g., a shroud). To couple the barrier can 452 to the forward bearing housing 428, a barrier can retainer 454 is positioned around a flange 456 of the barrier can 452 and coupled to an aft end of the forward bearing housing 428 via bolts 458. Further, an O-ring 459 is positioned between the flange 456 of the barrier can 452 and the barrier can retainer 454. The barrier can 452 hermetically seals the aft end of the forward bearing housing 428 and, in turn, prevents the heat exchange fluid from escaping. As such, the barrier can 452 prevents the heat exchange fluid from flowing past the coupling housing 424 and mixing with other fluids, such as the oil lubricant of the first roller bearing 440 and/or the second roller bearing 448, which would otherwise prevent thermal energy from being safely transferred between the heat exchange fluid and a working fluid. Additionally or alternatively, the barrier can 452 can hermetically seal the motor housing 412 to prevent the oil lubricant from mixing with and contaminating the heat exchange fluid.

In the illustrated example of FIG. 4, the barrier can 452 is positioned around a second magnetic coupling 460 (e.g., a male magnetic coupling), which is magnetically coupled to the first magnetic coupling 450. Specifically, opposite magnetic poles of the first magnetic coupling 450 and the second magnetic coupling 460 are aligned on opposite sides of the barrier can 452 to magnetically couple the first magnetic coupling 450 to the second magnetic coupling 460. As a result, the first magnetic coupling 450 and the second magnetic coupling 460 are rotatably interlocked. Accordingly, the first magnetic coupling 450 can drive a rotation of the second magnetic coupling 460. In some examples, the coupling housing 424 includes a vent 461 to enable a fluid (e.g., hydrogen, air, etc.) to circulate into and out of the coupling housing 424. In turn, as the barrier can 452 produces thermal energy as a result of encountering the rotating magnetic fields produced by the first magnetic coupling 450 and the second magnetic coupling 460, the heat exchange fluid can absorb the heat from the barrier can 452 to prevent the barrier can 452 from melting. In some examples, the vent 461 is open to atmospheric air, or another fluid enclosure, which provides the heat exchange fluid to absorb thermal energy from the barrier can 452.

In the illustrated example of FIG. 4, the second magnetic coupling 460 is coupled to a tie rod 462 (e.g., via a top hat) that extends through the forward bearing housing 428 and the backplate 432 to couple to the impeller 406. Additionally, the second magnetic coupling 460 is coupled to and/or extends from a shaft 466 positioned around the tie rod 462. Similarly, the shaft 466 extends through the forward bearing housing 428 and the backplate 432 to couple to the impeller 406. Accordingly, the tie rod 462 and the shaft 466 cause the impeller 406 to rotate with the second magnetic coupling 460 to drive (e.g., pump) the fluid.

In the illustrated example of FIG. 4, an axial portion 468 of the shaft 466 is supported by journal bearing assemblies 470 and a radial portion 472 of the shaft 466 is supported by a thrust bearing assembly 474. For example, the journal bearing assemblies 470 and/or the thrust bearing assembly 474 can include foil bearings. In some examples, the journal bearing assemblies 470 and the thrust bearing assembly 474 are coupled to the forward bearing housing 428 via bolts. Additionally or alternatively, the thrust bearing assembly 474 can be coupled to one of the journal bearing assemblies 470.

In the illustrated example of FIG. 4, the thermal transport bus pump 400 includes a secondary flow network having a secondary inlet 476 in the forward bearing housing 428. In the secondary flow network, the heat exchange fluid enters the forward bearing housing 428 and flows between the radial portion 472 of the shaft 466 and the thrust bearing assembly 474. In the secondary flow network, a first portion of the heat exchange fluid flows around the shaft 466 and into the compressor collector 408 between the impeller 406 and the backplate 432. A second portion of the heat exchange fluid in the secondary flow network flows around the shaft 466 towards the barrier can 452. Specifically, in the secondary flow network, the heat exchange fluid flows around the shaft 466 and flows between the axial portion 468 of the shaft 466 and the journal bearing assemblies 470. A separation between an aft end of the second magnetic coupling 460 and the barrier can 452 enables the heat exchange fluid to flow past the second magnetic coupling 460 and back through the shaft 466 towards the impeller 406. Further, the shaft 466 includes a duct 478 that guides the heat exchange fluid flowing therethrough between the backplate 432 and the impeller 406 causing the heat exchange fluid to enter the compressor collector 408. Accordingly, as the motor 410 drives the rotation of the shaft 438, the impeller 406 pumps the heat exchange fluid through the fluid conduit(s) 402 to an outlet 480.

In some examples, the thermal transport bus pump 400 utilizes sCO2 as the heat exchange fluid. In some examples, such as after a period of being powered down, the sCO2 may reduce in temperature and/or pressure, which move sCO2 to a liquid or gas state. In some examples, a presence of liquid CO2 flowing through the journal bearing assemblies 470, and/or the thrust bearing assembly 474 may adversely affect performance of the respective components and, in turn, the thermal transport bus pump 400. As discussed in greater detail below, the example secondary flow control system (e.g., secondary flow control system 800 of FIG. 8) can be integrated with a recirculation loop of the thermal transport bus pump 400 to prevent liquid CO2 from entering the secondary flow network.

Figure 5:
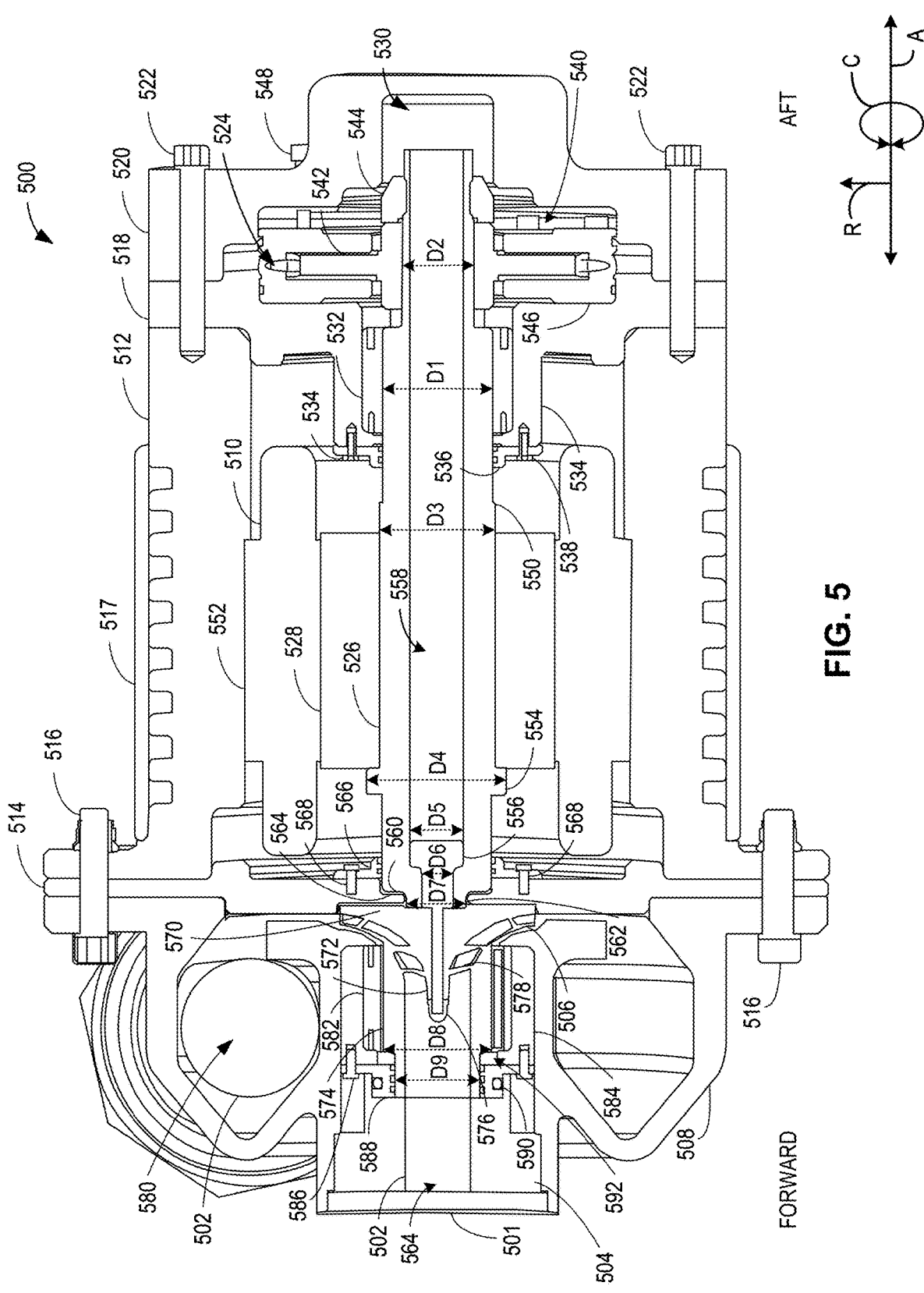

FIG. 5 illustrates another example thermal transport bus pump 500 (e.g., a straddle mounted fluid pump, a fluid pump, an sCO2 pump, the pump 304 of FIG. 3, etc.) with which disclosed examples may be implemented. In the illustrated example of FIG. 5, the thermal transport bus pump 500 drives a heat exchange fluid (e.g., carbon dioxide) through one or more fluid conduits 502 connected to a flowline (e.g., the thermal transport bus 302 of FIG. 3). The heat exchange fluid can flow through an inlet pipe 504 defining a primary inlet 501 and encounter an impeller 506 (e.g., a compressor wheel) that rotates to drive the heat exchange fluid through a compressor collector 508 (e.g., a volute housing, casing, etc.) fluidly coupled to the fluid conduit(s) 502. In turn, the fluid conduit(s) 502 can feed the heat exchange fluid to one or more heat exchangers (e.g., the heat source heat exchanger 306 and/or the heat sink heat exchanger 308 of FIG. 3) and back to the primary inlet 501.

In FIG. 5, the pump 500 includes a motor 510 positioned in a motor housing 512, which is at least partially surrounded by a cooling jacket 517 to help prevent a motor 510 in the motor housing 512 from overheating during operations. A compressor collector 508 is coupled to the motor housing 512 and a backplate 514 via bolts 516. An aft end of the motor housing 512 is coupled to an aft bearing housing 518 and a cover 520 via bolts 522. In some examples, the aft bearing housing 518 and/or the cover 520 is integral with the motor housing 512. An example secondary inlet (e.g., secondary flow inlet) 524 of the pump 500 that implements an inlet of a secondary flow network can be defined in the aft bearing housing 518 and/or the cover 520.

In FIG. 5, the pump 500 includes a shaft 526 coupled to a rotor 528 of the motor 510 such that the rotor 528 drives a rotation of the shaft 526. In FIG. 5, an aft portion of the shaft 526 (e.g., a portion of the shaft positioned aft of the rotor 528) extends through the aft bearing housing 518 and into an indentation 530 (e.g., a groove, a notch, a concavity, etc.) defined in a forward side of the cover 520. The aft bearing housing 518 includes a bearing cup 534 that extends forward into the motor housing 512.

The pump 500 includes a shaft radial bearing 532 (e.g., a first radial bearing) positioned in the bearing cup 534 to radially support the aft portion of the shaft 526. For example, the shaft radial bearing 532 can be a foil bearing, a hydrostatic bearing, etc. In some examples, the shaft radial bearing 532 is coupled to the bearing cup 534 via an interference fit (e.g., a press fit), screws, or any other means for coupling that prevents at least a portion of the shaft radial bearing 532 from rotating in the bearing cup 534. As such, a portion of the heat exchange fluid that flows through the secondary inlet 524 passes between the shaft radial bearing 532 and the shaft 526 as the heat exchange fluid moves toward the forward end of the pump 500, as discussed in further detail below. For example, the heat exchange fluid can lubricate the shaft radial bearing 532 during operation of the pump 500.

In the illustrated example of FIG. 5, a first labyrinth seal 536 is coupled to a forward end of the bearing cup 534 via screws and/or bolts 538. The first labyrinth seal 536 is positioned around the shaft 526 to help control a flow of the heat exchange fluid in the motor housing 512. Specifically, a pressure differential on opposite sides of the first labyrinth seal 536 prevents the heat exchange fluid from flowing past the first labyrinth seal 536 towards an aft end of the pump 500. Instead, the first labyrinth seal 536 enables the heat exchange fluid that flows between the shaft radial bearing 532 and the shaft 526 to continue to flow towards the forward end of the pump 500.

In the illustrated example of FIG. 5, the pump 500 includes a thrust bearing 540 (e.g., an axial bearing) positioned aft of the shaft radial bearing 532. The thrust bearing 540 includes a thrust disc 542 clamped onto to the shaft 526 via a spanner nut 544. Further, the thrust bearing 540 includes a foil bearing 546 positioned around the thrust disc 542 to prevent or otherwise reduce axial movement of the shaft 526. In FIG. 5, the foil bearing 546 is coupled to the aft bearing housing 518 and the cover 520 via bolts 548. In some examples, the foil bearing 546 is fixed to the aft bearing housing 518 and/or the cover 520 via an interference fit or any other means for coupling that prevents a rotation of the foil bearing 546.

In the illustrated example of FIG. 5, the shaft radial bearing 532 is positioned around a first aft portion of the shaft 526 including a first outer diameter D1, and the thrust disc 542 is positioned around a second aft portion of the shaft 526 including a second outer diameter D2 smaller than the first outer diameter. In some examples, the first and second aft portions of the shaft 526 include the same outer diameter. Furthermore, the aft portion of the shaft 526 can include a ridge 550 that defines a third outer diameter D3 proximate the first outer diameter D1. The ridge 550 in the aft portion of the shaft 526 can help deflect and guide the heat exchange fluid that flows past the first labyrinth seal 536 toward a passageway of the secondary flow network between a stator 552 of the motor 510 and the rotor 528. Additionally, a forward portion of the shaft 526 (e.g., a portion of the shaft 526 defined forward of the rotor 528) includes a flange 554 proximate a forward end of the rotor 528 to help prevent the shaft 526 from moving in an axial direction A defined by the pump 500. Accordingly, the flange 554 defines a fourth outer diameter D4 of the shaft 526.

In FIG. 5, a bolt 556 extends through a forward end of the shaft 526 to couple the shaft 526 to the impeller 506. That is, a head of the bolt 556 is positioned in a bore 558 of the shaft 526, and a stem of the bolt 556 extends at least partially through the impeller 506 to rotatably interlock the shaft 526 and the impeller 506. Specifically, the bore 558 extends through the shaft 526 in an axial direction A defined by the pump 500. Furthermore, a forward end of the bore 558 is narrowed such that an inner diameter of the shaft 526 (e.g., a diameter of the bore 558) changes from a first inner diameter D5 at, and aft of, an aft end of the bolt 556 to a second inner diameter D6 forward of the aft end of the bolt 556. Specifically, the second inner diameter D6 is smaller than a diameter of the aft end of the bolt 556 such that the second inner diameter D6 of the shaft 526 provides a stop for the head of the bolt 556. Additionally or alternatively, the impeller 506 can be coupled to the shaft 526 via a press fit, screws, or any other means for coupling that rotatably interlocks the impeller 506 and the shaft 526.

The forward portion of the shaft 526 includes a shoulder 560 and a neck 562. The shoulder 560 faces the forward end of the pump 500 and defines a transition from the second outer diameter of the shaft 526 forward of the flange 554 to a fifth outer diameter D7 defined by the neck 562 of the shaft 526. The fifth outer diameter D7 defines the smallest outer diameter of the shaft 526. In some examples, the fifth outer diameter is approximately equivalent to the first diameter of the bore 558. In some examples, the shaft 526 can include a uniform outer diameter. In FIG. 5, the neck 562 extends into an opening defined in the backplate 514. Specifically, the backplate 514 includes a shoulder brace 564 that is positioned around the shoulder 560 and the neck 562 of the shaft 526. Accordingly, the shoulder brace 564 can help align the shaft 526 in the motor housing 512.

In FIG. 5, the pump 500 includes a second labyrinth seal 566 coupled to the backplate 514 via screws 568. The second labyrinth seal 566 is positioned around the shaft 526 aft of the shoulder 560 to help control the flow of heat exchange fluid in the secondary flow network. In some examples, a pressure differential forward and aft of the second labyrinth seal 566 allows the heat exchange fluid to flow past the second labyrinth seal 566 towards the aft end of the pump 500 where the heat exchange fluid can be re-routed. In some examples, the second labyrinth seal 566 allows the fluid to through the motor housing 512 and into the compressor collector 508.

In FIG. 5, the impeller 506 includes a body 570 and a nose 572 defined forward of the body 570. In FIG. 5, a forward end of the stem of the bolt 556 passes through the body 570 and the nose 572, and a cap or stopper 576 is coupled to the end of the stem proximate the nose 572 of the impeller 506. Accordingly, the bolt 556 interlocks a rotation of the impeller 506 with a rotation of the shaft 526.

The impeller 506 includes a shroud 574 and expeller vanes 578 (e.g., blades) that extend radially outward from the body 570. In FIG. 5, the forward end of the bolt 556 is positioned forward of expeller vanes 578 while an aft portion of the shroud 574 is fixed to ends of the expeller vanes 578 opposite the body 570. Accordingly, the shroud 574 and the body 570 define another passageway of the secondary flow network.

During operation, the shaft 526 rotates the impeller 506 to cause the expeller vanes 578 compress and drive the heat exchange fluid radially outward. In turn, at least a portion of the heat exchange fluid can be driven through an outlet 580 of the pump 500 in connection with the thermal transport bus 302 of FIG. 3 (e.g., the primary flow network). In some examples, an aft side of the body 570 of the impeller 506 includes a second set of expeller vanes to drive heat exchange fluid that flows between the backplate 514 and the aft side of the body 570 radially outwards, as discussed further in association with FIG. 6. In some other examples, the aft side of the body 570 of the impeller 506 does not include the second set of expeller vanes to enable the heat exchange fluid to flow between the backplate 514 and the aft side of the body 570 such that the heat exchange fluid can enter the motor housing 512.

A forward portion of the shroud 574 extends forward of the expeller vanes 578 past the nose 572. Accordingly, the forward portion of the shroud 574 defines a perimeter within which the heat exchange fluid flows in advance of being driven by the expeller vanes 578. Specifically, an inner surface of the forward portion of the shroud 574 is radially aligned with an inner surface of the inlet pipe 504 that defines the primary inlet 501 of the pump 500. Accordingly, when the heat exchange fluid enters the pump 500 through the primary inlet 501, the expeller vanes 578 can drive at least a portion of the fluid through the outlet 580. In FIG. 5, the conduit 502 associated with the primary inlet 501 is coupled to the compressor collector 508 via an interference fit. In some examples, the conduit 502 is formed by the compressor collector 508 (e.g., is integral with the compressor collector 508).

In FIG. 5, an impeller bearing 582 (e.g., a second radial bearing) supports the impeller 506 in the compressor collector 508. In the illustrated example of FIG. 5, the impeller bearing 582 is a foil bearing. Additionally or alternatively, the impeller bearing 582 can include a hydrodynamic bearing, or any other bearing that can support the impeller 506 as the impeller 506 rotates. The impeller bearing 582 of FIG. 5 is positioned around the shroud 574 of the impeller 506. Thus, the impeller bearing 582 is positioned around a portion of the expeller vanes 578 and extends forward of the nose 572 of the impeller 506. In other example, the impeller bearing 582 can positioned aft of the nose 572, around the nose 572, etc., such that the impeller bearing 582 supports the impeller 506.

In FIG. 5, a fluid re-flow passageway is defined between the impeller bearing 582 and the shroud 574 of the impeller 506. Specifically, a portion of the fluid driven by the expeller vanes 578 can flow back between the shroud 574 and the impeller bearing 582. Accordingly, the heat exchange fluid can cause the impeller bearing 582 to separate from, and avoid contact with, the shroud 574 in response to the impeller 506 rotating at a rate that satisfies (e.g., is greater than) a threshold rotational speed or angular velocity. In some examples, when the impeller bearing 582 is the hydrodynamic bearing and/or the rolling element bearing, the pump 500 does not include the fluid re-flow passageway.

In FIG. 5, the impeller bearing 582 can be coupled to a bearing cup 584 (e.g., a bearing sleeve) fixed within the compressor collector 508. For example, the impeller bearing 582 can be coupled to the bearing cup 584 via an interference fit (e.g., a press fit) or any other coupling that prevents at least a portion of the impeller bearing 582 from rotating in the bearing cup 584, such as a pin, a key, a spline, a machined flat, etc. Further, the bearing cup 584 can be fixed to the compressor collector 508 via an interference fit, screws, or any other coupling mechanism.

In FIG. 5, a third labyrinth seal 588 is coupled to a forward end of the bearing cup 584 via screws 586. The third labyrinth seal 588 is positioned around a forward portion of the shroud 574. Specifically, the impeller bearing 582 is positioned around a first portion (e.g., an aft portion) of the shroud 574 having a first outer diameter D8 and the third labyrinth seal 588 is positioned around a second portion (e.g., the forward portion) of the shroud 574 having a second outer diameter D9 smaller than the first outer diameter D8. In some examples, the first outer diameter D8 of the shroud 574 is approximately equivalent to the first outer diameter D1 of the shaft 526. In some examples, the shroud 574 includes a uniform outer diameter. Furthermore, an O-ring 590 can be positioned in a groove around an outer radial portion of the third labyrinth seal 588. Specifically, the O-ring 590 is positioned between the third labyrinth seal 588 and the conduit 502 (e.g., a body of the conduit 502). In some examples, the conduit 502 (e.g., the body of the conduit 502) helps maintain a position of the bearing cup 584 in the compressor collector 508.

The third labyrinth seal 588 helps control a flow of the fluid such that the fluid that flows through the inflow conduit 502 cannot flow between the third labyrinth seal 588 and the shroud 574. Moreover, the third labyrinth seal 588 enables the heat exchange fluid that passes through the fluid re-flow passageway of the secondary flow network to flow around the forward end of the shroud 574 and mix with the heat exchange fluid flowing through the inflow conduit 502. Accordingly, in response to flowing through the fluid re-flow passageway, the heat exchange fluid can again be driven by the expeller vanes 578. In FIG. 5, a pocket 592 is defined between the impeller bearing 582 and the third labyrinth seal 588. The pocket 592 can help create a pressure differential that prevents fluid from flowing past the third labyrinth seal 588 toward the aft end of the pump 500.

As a result, the impeller bearing 582 can support the impeller 506 directly to increase a stability of the impeller 506 and the shaft 526. Further, the impeller bearing 582 enables a length of the shaft 526 to be reduced, which further reduces an amplitude of deflections that the shaft 526 may encounter from a force being imparted on the impeller 506. Additionally, reducing the length and, in turn, the weight of the shaft 526 reduces a power output that the motor 510 utilizes to drive the rotation of the shaft 526. In turn, the motor 510 can drive the shaft 526 and the impeller 506 with a greater angular velocity while reducing vibrations of the shaft 526 and the impeller 506. As such, the greater angular velocity of the impeller 506 enables the pump 500 to expel the heat exchange fluid with an increased flow rate and/or pressure, which can increase a rate at which thermal energy is transferred to and/or from the heat exchange fluid as the heat exchange fluid flows through the heat exchanger(s) 306, 308 of FIG. 3. Accordingly, the improved thermal energy transfer that the pump 500 provides can enable certain components of the aircraft 10 of FIG. 1 and/or the gas turbine engine 100 of FIGS. 1 and/or 2 to operate within increased temperature ranges. Furthermore, because the impeller bearing 582 mounts the impeller 506 instead of the forward portion of the shaft 526, the impeller bearing 582 enables a size of the motor housing 512 and, thus, a size of the pump 500 to be reduced. Moreover, the size reduction enabled by the impeller bearing 582 can reduce a cost and/or a weight of the pump 500.

Figure 6:
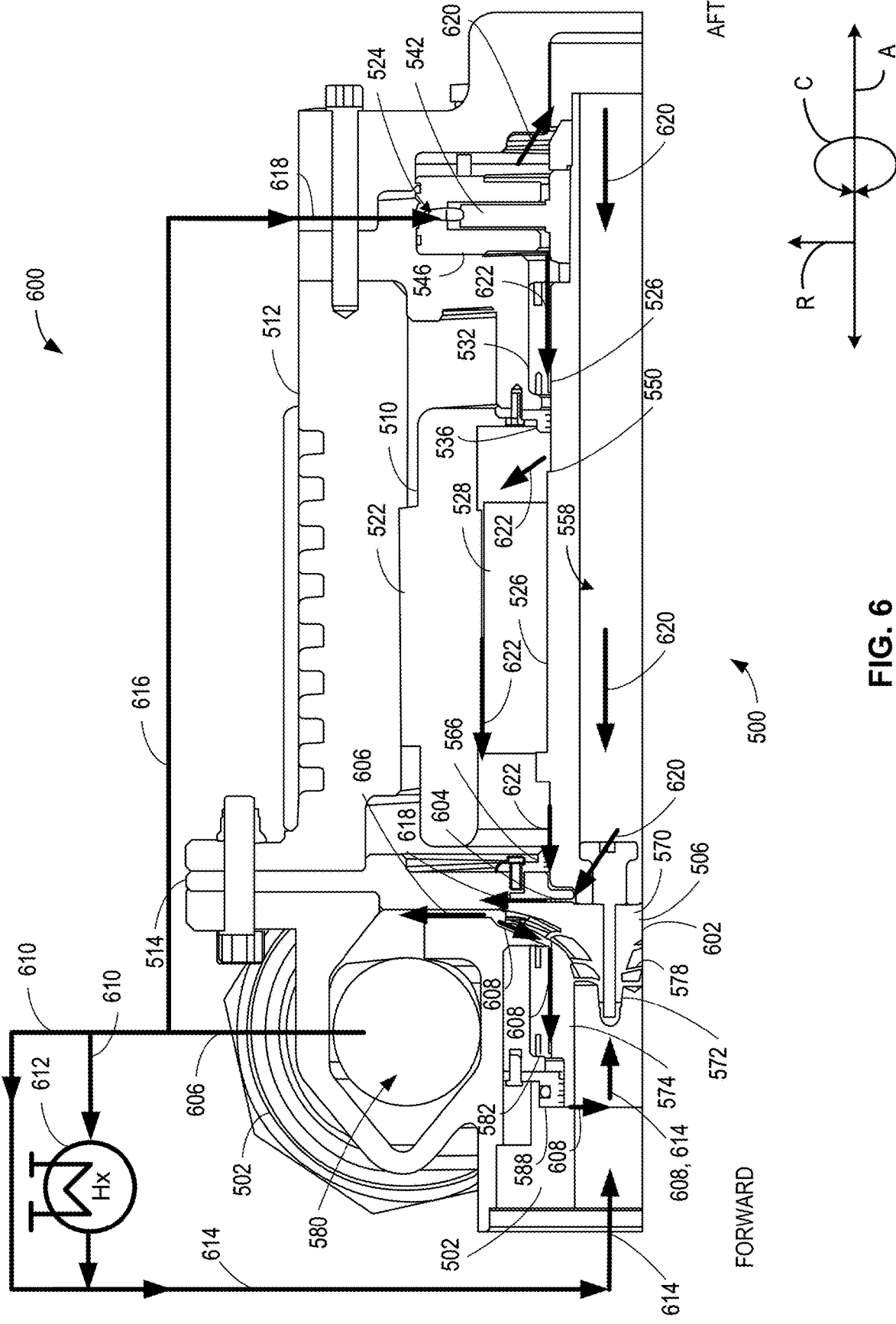
FIG. 6 illustrates an example fluid flow diagram associated with the thermal transport bus pump of FIG. 5.

FIG. 6 illustrates an example fluid flow diagram 600 associated with the example fluid pump 500 of FIG. 5. In the illustrated example of FIG. 6, the fluid pump 500 includes a third example impeller 602 in addition to the body 570, the nose 572, the shroud 574. The third impeller 602 includes back expeller vanes 604 extending from an aft side of the body 570. Specifically, the back expeller vanes 604 extend between the aft side of the body 570 and the backplate 514.

During operation, a heat exchange fluid enters the primary inlet 501 and encounters the impeller 506, which rotates and drives the heat exchange fluid radially outward between the compressor collector 508 and the backplate 514. A first portion 606 of the heat exchange fluid corresponding to a primary network of the pump 500 is driven through the outlet 580. In response to being driven through the outlet 580, a primary portion 610 of the first portion 606 the heat exchange fluid can flow through one or more heat exchangers 612 (e.g., the heat source heat exchanger(s) 306 of FIG. 3, the heat sink heat exchanger(s) 308 of FIG. 3, etc.). In some examples, some of the primary portion 610 of the first portion 606 of the heat exchange fluid bypasses the heat exchanger(s) 612. Further, the primary portion 610, after flowing through the one or more heat exchangers 612 and/or bypassing the heat exchangers 612, re-enters the primary inlet 501 as a primary input heat exchange fluid 614.

Further, a second portion 608 of the heat exchange fluid flows towards the forward end of the pump 500 between the impeller bearing 582 and the shroud 574 of the impeller 506. In some examples, the second portion 608 of the heat exchange fluid can deflect off the compressor collector 508. In some examples, a pressure of the first portion 606 of the heat exchange fluid can cause the second portion 608 of the heat exchange fluid to flow towards the forward end of the pump 500. Further, the third labyrinth seal 588 enables the second portion 608 of the heat exchange fluid to flow past a forward end of the shroud 574. In turn, the second portion 608 of the heat exchange fluid can flow between the forward end of the shroud 574 and an aft end of the conduit 502 such that the second portion 608 of the heat exchange fluid mixes with the primary input heat exchange fluid 614. Accordingly, the second portion 608 of the heat exchange fluid is again driven by the impeller 506 along with the primary input heat exchange fluid 614. As such, the pump 500 maintains a recirculating flow that follows the second portion 608 of the heat exchange fluid and, in turn, provides lubrication for the impeller bearing 582. In some examples, when the impeller bearing 582 is a hydrodynamic bearing and/or a rolling element bearing, the impeller bearing 582 does not leave space for the second portion 608 of the fluid to separate from the first portion 606 of the fluid, and, in turn, the second portion 608 of the fluid is driven through the outlet 580 along with the first portion 606 of the fluid.

In response to being driven through the outlet 580, a secondary portion 616 of the first portion 606 of the heat exchange fluid can be driven to a recirculation transport bus that provides the secondary portion 616 to a secondary flow network. Thus, the secondary portion 616 of the first portion 606 of the heat exchange fluid can form a secondary input heat exchange fluid 618 that re-enters the pump 500 through the secondary inlet 524 leading to the secondary flow network. Accordingly, the secondary input heat exchange fluid 618 flows between the thrust disc 542 and the foil bearing 546. A first portion 620 of the secondary input heat exchange fluid 618 flows towards the aft end of the pump 500. Further, a pressure in the pump 500 can cause the first portion 620 of the secondary input heat exchange fluid 618 to flow through the bore 558 in the shaft 526 towards the forward end of the pump 500. Further, a forward portion of the shaft 526 can include a conduit that carries the first portion 620 of the secondary input heat exchange fluid 618 out of the motor housing 512 between the impeller 506 and the backplate 514. As such, the first portion 620 of the secondary input heat exchange fluid 618 can mix with the first portion 606 of the heat exchange fluid between the backplate 514 at the aft side of the impeller 506. In turn, the back expeller vanes 604 can drive the secondary input heat exchange fluid 618 radially outward between the impeller 506 and the backplate 514. Accordingly, the secondary input heat exchange fluid 618 can mix with the first portion 606 of the heat exchange fluid being driven through the outlet 580.

Accordingly, the secondary portion 616 of the first portion 606 of the heat exchange fluid can be driven through the recirculation loop.

In the illustrated example of FIG. 6, a second portion 622 of the secondary input heat exchange fluid 618 flows towards the forward end of the pump 500 in response to entering the motor housing 512 through the secondary inlet 524. As such, the second portion 622 of the secondary input heat exchange fluid 618 flows between the shaft radial bearing 532 and the shaft 526. Furthermore, the first labyrinth seal 536 enables the second portion 622 of the secondary input heat exchange fluid 618 to pass through and flow towards the forward end of the pump 500. In turn, the second portion 622 of the secondary input heat exchange fluid 618 can flow between the rotor 528 and the stator 552 of the motor 510. In some examples, the ridge 550 of the shaft 526 can help deflect the second portion 622 of the secondary input heat exchange fluid 618 away from the shaft 526 and towards the passageway between the rotor 528 and the stator 552. Moreover, the second labyrinth seal 566 enables the second portion 622 of the secondary input heat exchange fluid 618 to past toward the forward end of the pump 500. As such, the second portion 622 of the secondary input heat exchange fluid 618 can mix with the first portion 606 between the backplate 514 at the aft side of the impeller 506. In turn, the back expeller vanes 604 can drive the secondary input heat exchange fluid 618 radially outward between the impeller 506 and the backplate 514. Accordingly, the secondary input heat exchange fluid 618 can mix with the first portion 606 of the heat exchange fluid being driven through the outlet 580. Accordingly, the secondary portion 616 of the first portion 606 of the heat exchange fluid can be driven through the recirculation loop.

While FIG. 6 is described in the context of the first example fluid pump 500, it should be understood that aspects of the example fluid flow diagram 600 may be associated with other types of pumps such as pumps mentioned above. In some examples, the thermal transport bus pump 500 utilizes fluid carbon dioxide as the heat exchange fluid (e.g., sCO2). A presence of liquid carbon dioxide flowing through the radial bearings 532, 582, the thrust bearing 540, the foil bearing 546, and/or the impeller 506 may adversely affect performance of the components, especially during start-up. As discussed in greater detail below, the example secondary flow control system 800 can be integrated with the pump 500 to prevent liquid carbon dioxide from entering the secondary inlet 524.

Figure 7:
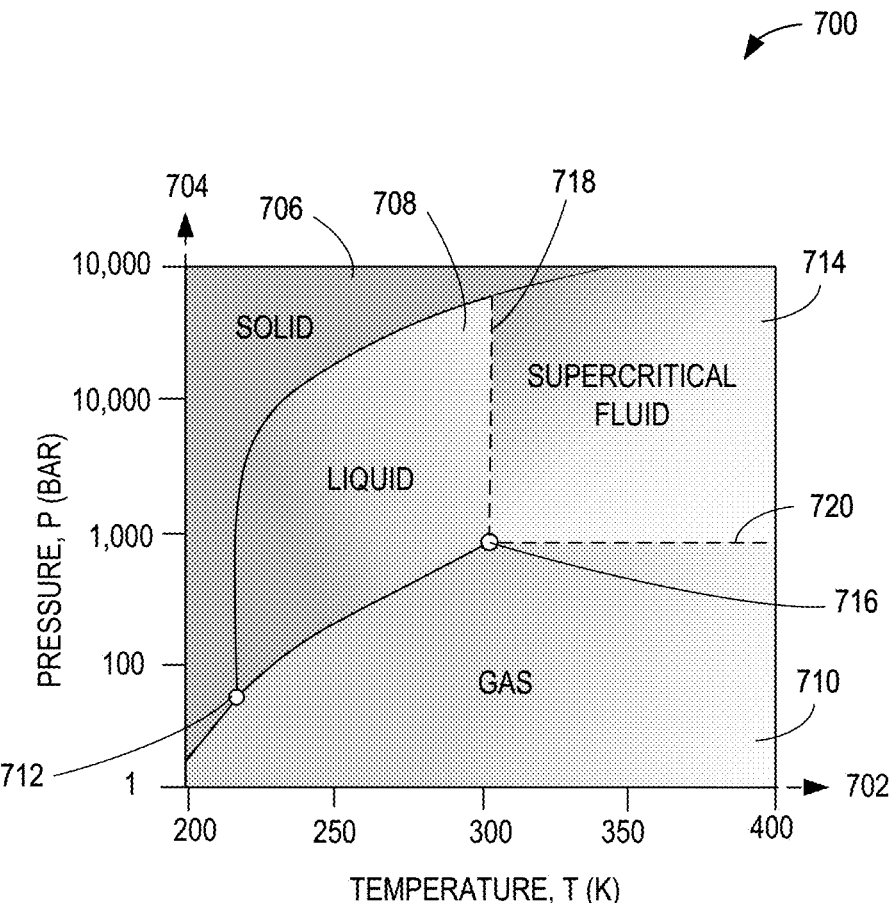
FIG. 7 is an example temperature-pressure phase diagram for carbon dioxide illustrating phases of carbon dioxide at different conditions.

FIG. 7 illustrates an example temperature-pressure phase diagram 700 that may be utilized to determine a state of carbon dioxide. The temperature-pressure phase diagram 700 include example temperatures (e.g., temperature values) associated with an x-axis 702 of the diagram 700 and example pressures (e.g., pressure values) associated with a y-axis 704 of the diagram 700. The temperature-pressure phase diagram 700 identifies different phases of carbon dioxide based on respective state temperature and pressure values. For example, the temperature-pressure phase diagram 700 identifies an example solid region 706 associated with a solid phase, an example liquid region 708 associated with a liquid phase, an example gas region 710 associated with a gas phase, and an example triple point 712, which is a point at the intersection of the solid region 706, the liquid region 708, and the gas region 710.

The temperature-pressure phase diagram 700 also identifies an example supercritical fluid region 714 associated with a supercritical phase and an example critical point 716, which is a point at the intersection of the liquid region 708, the gas region 710, and the supercritical fluid region 714. Supercritical carbon dioxide is a fluid state of carbon dioxide at which the carbon dioxide is held at or above its critical temperature 718 and critical pressure 720. The critical point 716 is an endpoint of a phase equilibrium curve between the liquid region 708 and the gas region 710 at which a liquid and its vapor can coexist. At the critical point 716, phase boundaries disappear.

Supercritical carbon dioxide adopts properties of a gas and a liquid, expanding to fill a container like a gas but with a density like that of a liquid. At higher temperatures than the critical temperature 718, gaseous carbon dioxide cannot be liquefied by pressure alone, and at higher pressures than the critical pressure 720, liquid carbon dioxide cannot be vaporized by temperature alone. Carbon dioxide has a relatively low critical pressure of approximately 74 bar (7.38 megapascals (MPa), 1,070 pounds-per-square-inch (PSI), 72.8 atm) and critical temperature of approximately 304.1 K (31° C., 87.8° F.) allowing it to be an efficient fluid for power generating applications because small changes in temperature or pressure cause significant shifts in its density. While at the critical temperature 718, carbon dioxide can be pressurized (e.g., compressed) directly to a supercritical state (e.g., in the supercritical fluid region 714). While at the critical pressure 720, carbon dioxide can be readily heated to the supercritical state. The high density and volumetric heat capacity of CO2 relative to other working fluids makes it more energy-dense, enabling a size reduction of one or components in a pump 304, 400, 500, which can lead to lower capital costs.

In some examples, state information indicated by the temperature-pressure phase diagram 700 may be used to determine a state of carbon dioxide in a pump 304, 400, 500. For example, the temperature-pressure phase diagram 700 includes data points (e.g., numbers) that indicate different conditions (e.g., states, phases) of the carbon dioxide based on a pressure and a temperature of the carbon dioxide. By obtaining a temperature measurement and a pressure measurement of carbon dioxide entering or exiting the pump, a state of the carbon dioxide can be readily determined.

In some examples, the temperature-pressure phase diagram 700 can be used to generate threshold values, such as a threshold temperature and/or a threshold pressure at which a fluid can be treated as supercritical fluid for a specific use case. For example, a threshold temperature that is within 5% of the critical temperature 718 may indicate that carbon dioxide can be pressurized (e.g., compressed) directly to a substantially supercritical state and/or a near-supercritical state. Similarly, a threshold pressure that is within 5% of the critical pressure 720 may indicate that carbon dioxide can be readily heated to the substantially supercritical state and/or the near-supercritical state. In some examples, the threshold temperature and/or the threshold pressure can increase a region at which the carbon dioxide is treated as if it is in the supercritical fluid region 714.

Figure 8:
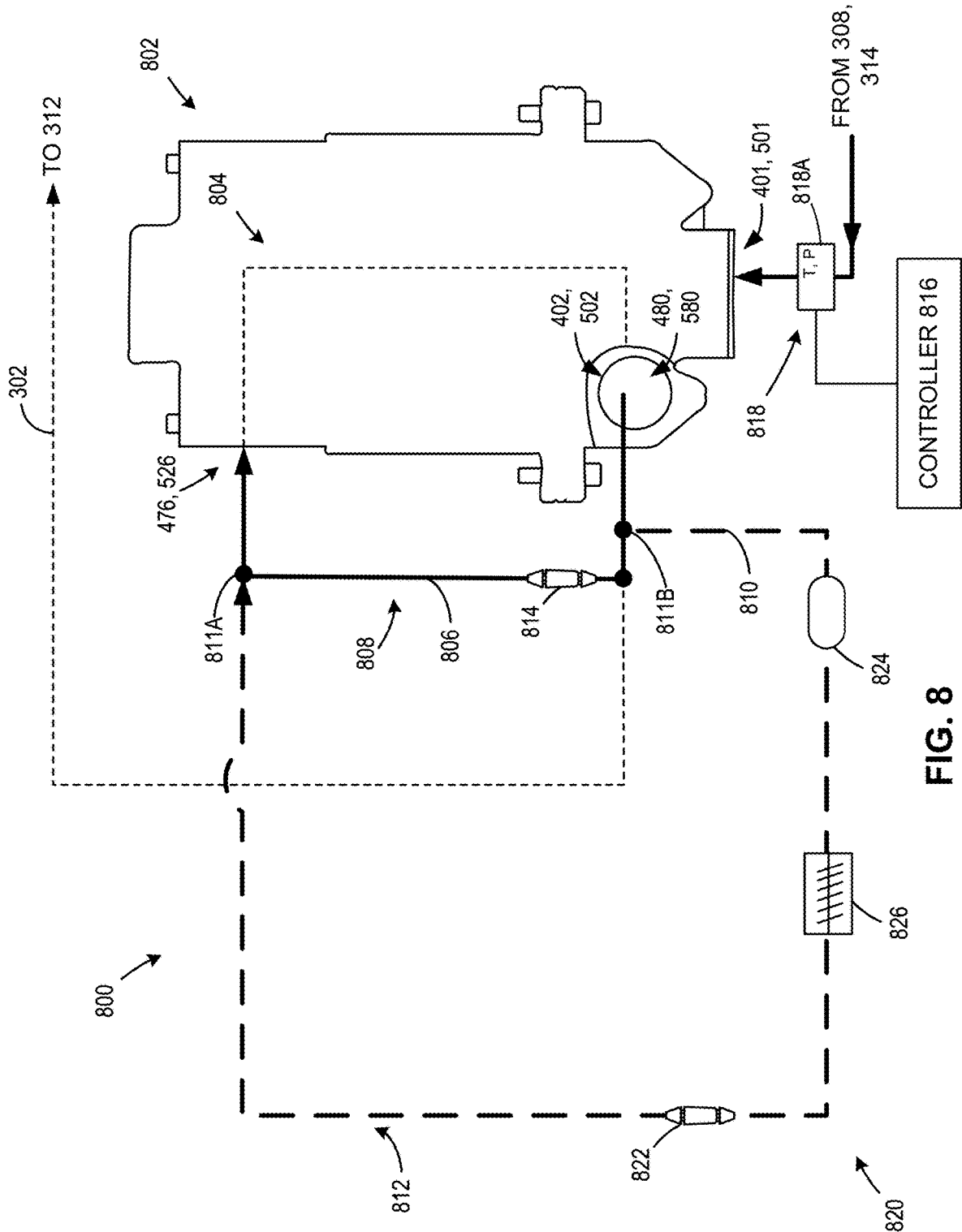
FIG. 8 is a schematic illustration of an example secondary flow control system configured in accordance with teachings of this disclosure for controlling a state of fluid that enters a secondary flow network for lubricating rotating components in a fuel pump.

FIG. 8 is a schematic illustration of an example secondary flow control system 800 structured in accordance with teachings of this disclosure to control a flow of working fluid (e.g., a pressurized lubricant) provided to internal components of a fluid pump. In the example of FIG. 8, the working fluid is carbon dioxide, but can be another fluid (e.g., a heat exchange fluid, a supercritical fluid, etc.) in additional or alternative examples. The secondary flow control system 800 is coupled to or otherwise integrated with an example pump 802 (e.g., the pump 304, a thermal transport bus pump 400, 500, and/or another fluid pump that utilizes a working fluid to lubricate a rotating component during operation).

The secondary flow control system 800 implements an ancillary (e.g., additional, supplemental, bypass, etc.) fluid flow control system that directs carbon dioxide flowing out of the pump 802 based on a state of the carbon dioxide.

As noted above, the pump 802 can include a fluid conduit 402, 502 fluidly connected to a flowline, such as the thermal transport bus 302 of FIG. 3. The thermal transport bus 302 defines a primary flowpath extending from an outlet 480, 580 of the pump 802 to a primary inlet 401, 501, allowing the pump 802 to drive the working fluid through different heat exchangers. In some examples, the fluid conduits 402, 502 coupled to the thermal transport bus 302 can define a primary flowpath of the pump 802.

The pump 802 of FIG. 8 includes an example secondary flow network 804 (not shown) that includes flowpaths within the pump 802 to provide a fluid flow to certain components (e.g., the bearings 470, 474, 532, 582, 540, 546, 582, that shaft 466, 526 the impeller 406, 506, etc.; not shown in FIG. 8) within the pump 802. The pump 802 also includes an example conduit (e.g., secondary conduit, secondary transport bus, recirculation transport bus, etc.) 806 fluidly coupled between the pump outlet 480, 580 and a secondary inlet 476, 524 of the pump 802. In some examples, the recirculation transport bus 806 is fluidly coupled to a portion of the thermal transport bus 302 adjacent the pump outlet 480, 580 to tap a portion of the working fluid from a primary flow. In some examples, the recirculation transport bus 806 is fluidly coupled to a portion of the fluid conduit 402, 502 at the pump outlet 480, 580. In some examples, the secondary flow network 804 and the recirculation transport bus 806 define an example recirculation loop of the pump 802. In some examples, the recirculation transport bus 806 defines an example secondary (e.g., recirculation) flowpath 808 that provides carbon dioxide to the secondary flow network 804 to support certain components within the pump 802.

The secondary flow control system 800 is integrated with the recirculation loop to control a state of carbon dioxide that enters the secondary flow network 804 and, in turn, a state of carbon dioxide that flows around the components of the pump 802. The secondary flow control system 800 includes an example bypass conduit (e.g., bypass transport bus) 810 defining an example bypass (e.g., additional, conversion, second, etc.) flowpath 812 that circumvents a portion of the secondary flowpath 808. In the illustrated example of FIG. 8, a downstream end of the bypass conduit 810 is fluidly coupled to a downstream region 811A of the recirculation transport bus 806. However, in some examples, the downstream end of the bypass conduit 810 fluidly coupled to the recirculation loop in additional or alternative locations. For example, the downstream end of the bypass conduit 810 can be fluidly coupled to the secondary inlet 476, 524, a valve that is coupled to the secondary inlet 476, 524, etc.

In some examples, an upstream end of the bypass conduit 810 is fluidly coupled to an upstream region 811B of the recirculation transport bus 806 that is adjacent the pump outlet 480, 580. However, in some examples, the upstream end of the bypass conduit 810 can be fluidly coupled to the recirculation loop in additional or alternative locations. For example, the upstream end of the bypass conduit 810 can be fluidly coupled to the pump outlet 480, 480, to a valve fluidly coupled to the pump outlet 480, 580, to a portion of the thermal transport bus 302 adjacent the pump outlet 480, 580, etc. In other words, the bypass conduit 810 may be fluidly coupled to the recirculation loop such that carbon dioxide can flow through the bypass flowpath 812 before entering the secondary inlet 476, 524.

The secondary flow control system 800 of FIG. 8 also includes an example first thermal valve 814, an example controller 816, example fluid sensors 818, and an example bypass circuit 820 that extends along the bypass conduit 810. As discussed in further detail below, the controller 816 directs a given portion of carbon dioxide flowing through the thermal management system 300 to the first thermal valve 814 or to the bypass circuit 820 based on sensor data from the fluid sensors 818. In other words, the controller 816 is configured to direct a given flow of $CO_2$ to the secondary inlet 476, 524 via the recirculation transport bus 806 and/or via the bypass conduit 810.

The first thermal valve (e.g., first thermal control valve, temperature control valve) 814 is a thermally activated valve. The first thermal valve 814 is fluidly coupled to recirculation transport bus 806 to control a flow of fluid through the secondary flowpath 808. While the first thermal valve 814 is open, at least a portion of $CO_2$ can flow through the first thermal valve 814 towards the secondary inlet 476, 524. The first thermal valve 814 may be mechanical, electrical, pneumatic, etc., or a combination thereof.

The first thermal valve 814 controls a flow of carbon dioxide through the valve 814 based on its fluid state (e.g., based on a temperature of the $CO_2$). The first thermal valve 814 can include an example actuator 814A (not shown in FIG. 8) that controls a position of the valve 814. In some examples, the first thermal valve 814 is a thermal control valve configured to selectively actuate between discrete positions to adjust a pressure of the $CO_2$ flow. The first thermal valve 814 may be externally actuated (e.g., by the controller 816) or may be self-actuated (e.g., a thermostatic valve having internal sensors and actuator(s)). For example, the first thermal valve 814 may include a fluid sensor 818, such as a temperature sensor/gauge to measure the temperature of the $CO_2$ flow, which is transmitted to the controller 816. In turn, the controller 816 may cause the first thermal valve 814 to selectively actuate. In some examples, the first thermal valve 814 may include a temperature sensor internally coupled to an actuator that moves the valve 814 between the discrete positions based on the temperature of the $CO_2$ flow.

The controller 816 is communicatively coupled to the fluid sensors 818 via a wired and/or wireless connection. The controller 816 is structured to monitor $CO_2$ entering the secondary flowpath 808 based on sensor data from the fluid sensors 818 and to actuate components of the secondary flow control system 800 accordingly. For example, the controller 816 may be configured to control (e.g., actuate) the first thermal valve 814 based on a state of $CO_2$ that is to enter the recirculation transport bus 806.

The fluid sensors 818 can include a temperature sensor, a pressure sensor, a flow rate sensor, etc., which are structured to collect measurements of $CO_2$ as it flows relative to the pump 802, relative to the recirculation transport bus 806, and/or relative to the bypass conduit 810 to enable the controller 816 to detect a condition of the $CO_2$. As disclosed herein, a condition of a fluid refers to a fluid measurement (s)/flow parameter(s) (e.g., temperature, pressure, etc.) and, in turn, a state (phase) of the fluid, which can be determined based on the fluid measurement(s). The fluid sensors 818 monitor flow parameters (temperature, flow rate, pressure, etc.) of the $CO_2$ and transmit flow parameter readings to the controller 816. For example, the fluid sensors 818 of FIG. 8 includes an example first sensor 818A having a temperature gauge and a pressure gauge, which enables the sensor 818A to measure a temperature and a pressure of $CO_2$. In some examples, the first sensor 818A is positioned at the primary inlet 401, 501 of the pump 802. In some such examples, the controller 816 can obtain the measurements of a $CO_2$ flow as it enters the primary inlet 401, 501 (e.g., via the fluid sensor 818A) and determine a state the $CO_2$ flow prior to the $CO_2$ entering the secondary flowpath 808.

In some examples, the fluid sensors 818, 818A enable the controller 816 to determine a state of $CO_2$ flow before the $CO_2$ flows reaches an entrance to the bypass flowpath 812. Further, the secondary flow control system 800 can include additional or alternative temperature gauges and/or pressure gauges positioned at additional or alternative locations such that the controller 816 can determine a state of a carbon dioxide flow. For example, the secondary flow control system 800 may include another pressure sensor/gauge along the recirculation transport bus 806 to identify a change in pressure from the primary inlet 401, 501 to the outlet 480, 580 of the pump. In some examples, the fluid sensors 818 includes additional sensors/gauges positioned along the secondary flowpath 808 and/or the bypass flowpath 812 to detect a condition of the $CO_2$ as it flows along a respective flowpath.

The controller 816 is configured to monitor the fluid sensors 818, 818A to detect a condition of carbon dioxide flow based on pressure and temperature measurements. For example, the controller 816 can receive a pressure and a temperature of carbon dioxide as it flows past the fluid sensors 818 and determine a state the carbon dioxide flow based on information indicated in the temperature-pressure phase diagram 700 of FIG. 7. For example, the controller 816 can compare the pressure and the temperature measurements to a critical pressure and a critical temperature, respectively, to determine whether the $CO_2$ flow is supercritical. In some examples, when the pressure and/or the temperature measurements do not reach respective critical values, the controller 816 may determine a temperature and/or pressure that is needed to move the carbon dioxide flow towards the supercritical state, a substantially supercritical state, and/or a near-supercritical state (e.g., depending on a trigger point for the secondary flow control system 800). For example, as discussed in further detail below, the controller 816 can include threshold values (e.g., a threshold temperature and/or a threshold pressure) that are below the critical values (e.g., the critical temperature and/or the critical pressure) of a fluid at which the controller 816 treats the fluid as a supercritical critical fluid.

The controller 816 can utilize sensor data from the fluid sensors 818A to ensure that fluid $CO_2$ that enters the secondary inlet 476, 524 from the secondary flowpath 808 is in a supercritical state rather than in a liquid state. For example, when the controller 816 determines a carbon dioxide flow is in or near a supercritical state, the controller 816 may cause the first thermal valve 814 to open to allow the $CO_2$ flow to pass through the valve 814, along the secondary flowpath 808, and through the secondary inlet 476, 524. In some examples, this is a steady-state condition. In some such examples, the controller 816 may control the first thermal valve 814 to open or close based on a determination that the first thermal valve 814 can move the $CO_2$ flow to a supercritical state. For example, the controller 816 may identify whether the first thermal valve 814 is capable of moving the $CO_2$ flow to a substantially supercritical state and, if so, cause the first thermal valve 814 to open. In some examples, the first thermal valve 814 is configured to open or close based on a temperature measurement of carbon dioxide flowing through the valve 814.

On the other hand, when the controller 816 determines that a $CO_2$ flow entering the secondary flowpath 808 is in a liquid state, the controller 816 cause the first thermal valve 814 to close, determine a temperature and/or pressure that is needed to move the CO2 flow to a supercritical state, and actuate the example bypass circuit 820. The bypass circuit 820 is structured to create a pressure and/or temperature condition(s) to move liquid carbon dioxide to or near a substantially supercritical state. In some examples, the controller 816 and/or the bypass circuit 820 allow the secondary flow control system 800 to ensure liquid carbon dioxide does not flow through the secondary flow network 804.

The bypass circuit 820 is structured to provide sCO2 to the secondary flowpath 808 when a CO2 flow exiting the pump outlet 480, 580 is not at or near a substantially supercritical state. To do so, the bypass circuit 820 includes different components that extend along the bypass flowpath 812, including an example second (e.g., bypass) thermal valve 822, an example auxiliary reservoir 824, and an example heater 826. In some examples, the controller 816 actuates the bypass circuit 820 by causing a second thermal valve 822 to open.

The second thermal valve 822, which is fluidly coupled along a region of the bypass conduit 810, is structured to control a CO2 flow through the bypass flowpath 812. In the illustrated example of FIG. 8, the second thermal valve 822 is positioned downstream relative to the auxiliary reservoir 824 and the heater 826. However, the second thermal valve 822 can be positioned upstream of the auxiliary reservoir 824, the heater 826, and/or another bypass circuit 820 components in additional or alternative examples. While the second thermal valve 822 is open, at least a portion of the CO2 flow can pass through the valve 822 and towards the secondary inlet 476, 524. The second thermal valve 822 may be mechanical, electrical, pneumatic, etc. or a combination thereof.

In some examples, the second thermal valve 822 is the same type of valve as the first thermal valve 814. For example, the second thermal valve (e.g., first thermal control valve, temperature control valve) 822 can be a thermally activated valve fluidly coupled to bypass conduit 810 to control a flow of fluid through the bypass flowpath 812. The second thermal valve 822 can include an example actuator 822A (not shown in FIG. 8) that controls a position of the valve 822. Further, the second thermal valve 822 can control a CO2 flow through the valve 822 based on its fluid state (e.g., based on a temperature of the CO2) by selectively actuating between discrete positions to adjust a pressure of the CO2 flow. Moreover, the second thermal valve 822 can be externally actuated (e.g., by the controller 816) and/or self-actuated. Further, the second thermal valve 822 can include a temperature sensor/gauge to measure the temperature of the CO2 flow, which is transmitted to the controller 816. In turn, the controller 816 may cause the second thermal valve 822 to selectively actuate. In some examples, the second thermal valve 822 may include a temperature sensor internally coupled to an actuator that moves the valve between the discrete positions based on the temperature of the CO2 flow. However, the first and second thermal valve 814, 822 may be different types of thermal valves in alternative examples.

In additional or alternative examples, the first thermal valve 814 and/or the second thermal valve 822 can be a pinch (e.g., check, cement, etc.) valve configured to support a column of fluid until an increase in pressure is applied to the column (e.g., from above). When the increased pressure is realized, the pinch valve can open to allow the fluid in the column to flow through the valve.

The auxiliary reservoir (e.g., pressure vessel, pressure tank, pressurizer, etc.) 824 is structured to store sCO2. By storing CO2 in a supercritical state, the secondary flow control system 800 can provide sCO2 to the secondary flowpath 808 upon detection of a liquid CO2 flow. For example, sCO2 stored in the auxiliary reservoir 824 may be provided to the secondary flowpath 808 at startup of the pump 802.

The auxiliary reservoir 824 holds carbon dioxide at a pressure substantially larger than an ambient pressure surrounding the auxiliary reservoir 824. Thus, the auxiliary reservoir 824 is associated with a pressure differential. In some examples, this pressure differential can generate a flow of sCO2 stored in the auxiliary reservoir 824 to the bypass conduit 810. For example, when the controller 816 causes the second thermal valve 822 to open, a pressure differential between the auxiliary reservoir 824 and the bypass conduit 810 can generate the sCO2 flow into the bypass conduit 810. In some examples, the controller 816 controls a valve coupled to the auxiliary reservoir 824 to bleed sCO2 into the bypass flowpath 812. In some examples, the auxiliary reservoir 824 is utilized until the secondary flow control system 800 reaches a steady state. As noted above, at the steady state, carbon dioxide entering the secondary flowpath 808 is at or near a supercritical state. The auxiliary reservoir 824 may hold sCO2 in reserve until a next start-up and/or if the system 800 becomes unstable.

The auxiliary reservoir 824 of FIG. 8 is configured to pressurize carbon dioxide within the auxiliary reservoir 824 to generate the pressure differential. That is, the auxiliary reservoir 824 may be provided fluid CO2 that is not in a supercritical state and charged to generate sCO2. In some examples, the auxiliary reservoir 824 is charged when the system 800 reaches a steady state condition while the pump 802 is operational. For example, the controller 816 may cause the auxiliary reservoir 824 to pressurize CO2 in the auxiliary reservoir 824 to increase in pressure during operation of the aircraft 10 and/or gas turbine engine 100. In some examples, the auxiliary reservoir 824 can boost pressure by approximately 50 psi.

The example heater (e.g., thermal fluid heater, etc.) 826 is configured to provide heat to a CO2 flow from the auxiliary reservoir 824 to move the CO2 to, or further to, a supercritical state. Whereas the auxiliary reservoir 824 provides pressure to fluid CO2 to adjust its state, the heater 826 provides heat to the fluid CO2 to further adjust a state of the fluid CO2. The heater 826 may be controlled by the controller 816 (e.g., via an example heater actuator 816A, not shown in FIG. 8). In some examples, the heater 826 is an in-line heater, such as a forced circulation coil type thermal fluid heater in which fluid circulates through a set of coils. However, the heater 826 can be any type of heat supplier that can provide sufficient heat to adjust fluid carbon dioxide to a substantially supercritical state, such as (but not limited to) a wrap-around (e.g., clamp-on) heater, a pipe heater, a heat transfer exchanger, etc. While the second thermal valve 822 is open, fluid CO2 can flow from the heater 826, through the second thermal valve 822, and return to the secondary flowpath 808 to be provided to the secondary flow network.

While not illustrated in FIG. 8, the first thermal valve 814 and/or second thermal valve 822 can include an example valve actuator 814A, 822A, which is a mechanical device mechanically coupled to the valve 814, such that any movement of the valve 814 is due to a change in position of the actuator. Further, the heater 826 may include an example heat actuator 826A, which is structured to cause the heater to increase in temperature. In some examples, the valve actuator(s) 814A, 822A and/or the heater actuator 826A may be communicatively coupled to the controller 816. In such examples, the controller 816 can controller the thermal valve(s) 814, 822 and/or the heater 826 via the respective actuators.

Figure 9:
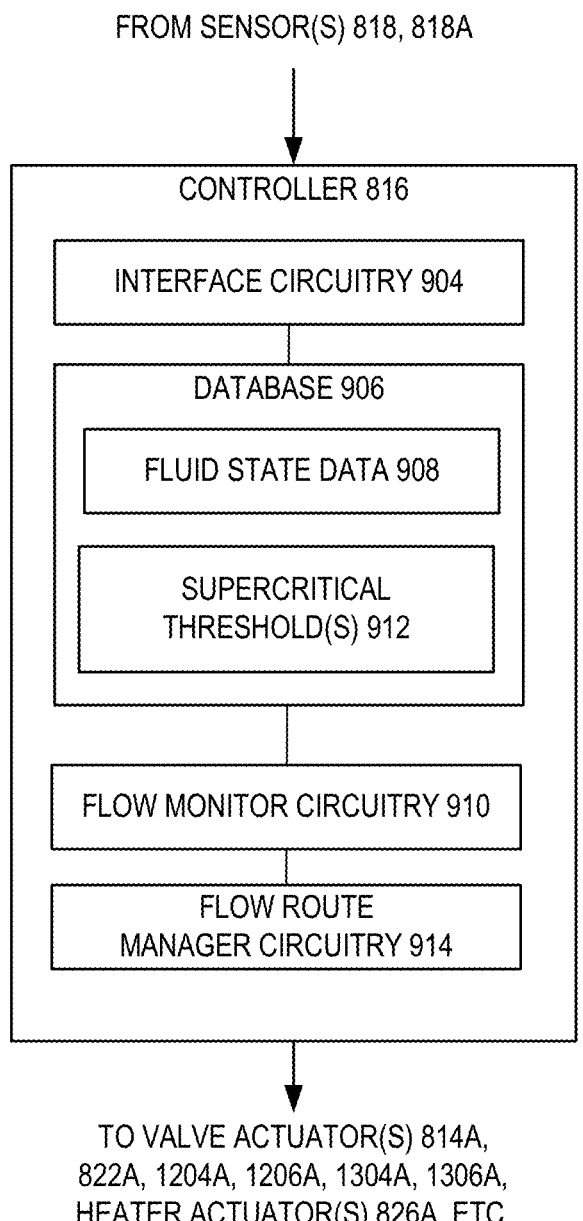
FIG. 9 is a block diagram of an example implementation of example secondary flow control systems disclosed herein.
Figure 12:
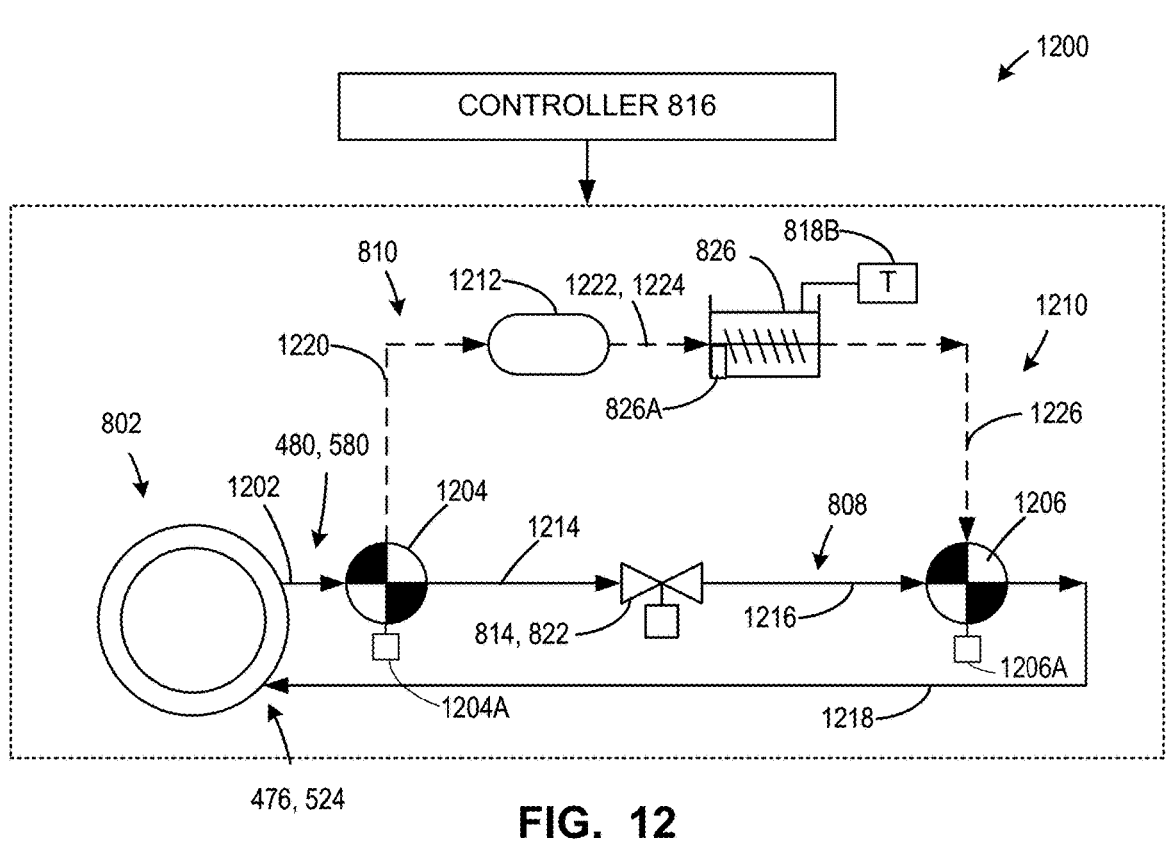
FIG. 12 illustrates another example fluid flow diagram associated with another example secondary flow control system structured in accordance with teachings of this disclosure.
Figure 13:
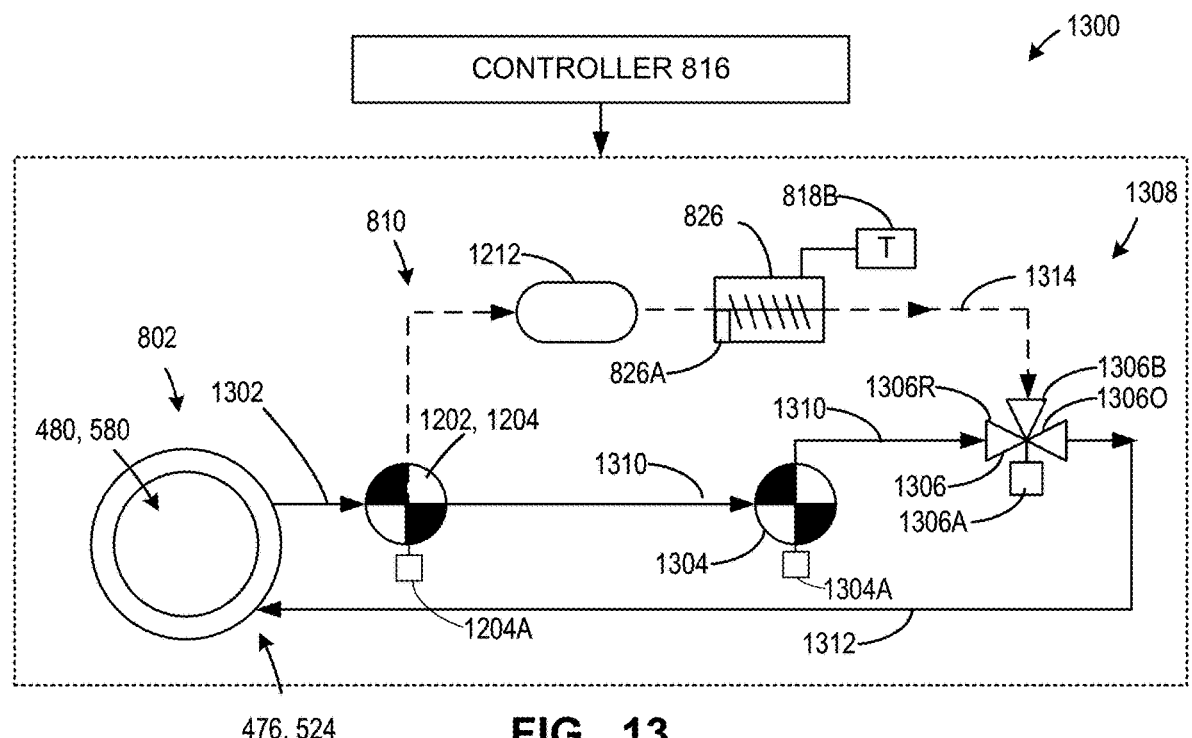
FIG. 13 illustrates another example fluid flow diagram associated with another example secondary flow control system structured in accordance with teachings of this disclosure.

FIG. 9 is a block diagram of the example controller 816 configured in accordance with teachings of this disclosure to manage secondary flow control system (e.g., a secondary flow control system(s) of FIG. 8, FIG. 12, and/or FIG. 13). The controller 816 of FIG. 9 may be instantiated (e.g., creating an instance of, bring into being for any length of time, materialize, implement, etc.) by processor circuitry such as a central processing unit executing instructions. Additionally or alternatively, the controller 816 of FIG. 9 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 9 may, thus, be instantiated at the same or different times. Some or all of the circuitry may be instantiated, for example, in one or more threads executing concurrently on hardware and/or in series on hardware. Moreover, in some examples, some or all of the circuitry of FIG. 9 may be implemented by microprocessor circuitry executing instructions to implement one or more virtual machines and/or containers.

The controller 816 illustrated in FIG. 9 includes example interface circuitry 904, which is structured to enable the controller 816 to communicate with other components of the secondary flow control system 800, 1200, 1300. For example, the controller 816 may be communicatively coupled to one or more fluid sensors 818, 818A that measure flow parameters/measurements of a working fluid, such as (but not limited to) fluid sensor(s) 818A at the primary inlet 401, 501 of the pump, fluid sensors 818 positioned along the recirculation transport bus 806 and/or the bypass conduit 810, a sensor(s) 818 associated with a valve, and/or other fluid sensors 818 associated with the secondary flow control system 800, 1200, 1300 may transmit measurement values to the controller 816. The interface circuitry 904 enables the controller 816 to obtain sensor data from the one or more sensors 818, 818A.

In some examples, the interface circuitry 904 enables the controller 816 to receive command inputs from an external source. For example, a person or machine can utilize the controller 816 to provide different trigger points (e.g., pressure and/or temperature values of a fluid flow) at which the controller 816 actuates the bypass circuit 820, a range of different charge conditions (e.g., for the bypass circuit 820 to charge a CO2 flow short of a supercritical state in view of diminishing returns of charging all the way to supercritical), etc. In some examples, the interface circuity 904 is able to receive and/or transmit commands via wired and/or wireless connections. In some examples, the controller 816 transmits commands to the components (e.g., via the actuators) of the secondary flow control system 800, 1200, 1300 via the interface circuitry 904. For example, the controller 816 may communicatively coupled to one or more actuators (e.g., valve actuators 814A, 822A, etc., heater actuators 826A, etc.), each of which is associated with respective component of the secondary flow control system 800, 1200, 1300. In some examples, the actuators include thermal valve actuators (e.g., thermal valve actuator 814A, 822A) associated with respective thermal valves 814, 822. In some examples, the actuators include a heater actuator (e.g., heater actuator 826A) associated with the heater 826. In some examples, the actuators include pressure valve actuators associated with respective pressure valves 1204, 1206, etc. In some examples, the actuators include additional or alternative actuators that are associated with respective additional or alternative components of the secondary flow control system 800, 1200, 1300.

The controller 816 illustrated in FIG. 9 includes an example database 906, which is structured to store information. For example, the database 906 may be used to store the temperature-pressure phase diagram 700 and/or another data structure that includes information (e.g., data) based on the temperature-pressure phase diagram 700. For example, the database 906 may include example fluid state data 908 that indicates phases of different state conditions of a working fluid. For example, the fluid state data 908 may include an indication of a state of CO2 based on a temperature and a pressure of the CO2. The database 906 can store other information in additional or alternative examples.

The controller 816 illustrated in FIG. 9 includes example flow monitor circuitry 910, which is structured to monitor a flow of a fluid (e.g., CO2) relative to a pump 304, 400, 500, 802. The flow monitor circuitry 910 may identify a pressure and a temperature of the fluid flow based on sensor data obtained from the sensor(s) 818, 818A. In some examples, the flow monitor circuitry 910 compares the temperature and the pressure of the fluid flow to a critical temperature and a critical pressure of the fluid to detect a state of the fluid flow. For example, the flow monitor circuitry 910 can determine whether the fluid is in a supercritical state, a liquid state, etc.

When the flow monitor circuitry 910 determines that a pressure of the fluid is at or above a critical pressure and a temperature of the fluid is at or above a critical temperature, the flow monitor circuitry 910 may identify the fluid as a supercritical fluid. When the flow monitor circuitry 910 identifies the supercritical fluid, the flow monitor circuitry 910 is configured to direct the supercritical fluid to the recirculation transport bus 806 defining the secondary flow-path 808. For example, the flow monitor circuitry 910 may cause transmit an instruction (e.g., a signal) to an actuator 814A associated with the first thermal valve 814 to cause the first thermal valve 814 to open. While the first thermal valve 814 is open, at least a portion of the supercritical fluid can flow through the valve 814 and the secondary inlet 476, 524.

When the temperature and/or the pressure is not at or above a respective critical value, the flow monitor circuitry 910 compares the temperature and the pressure of the fluid to example supercritical threshold(s) 912, which can be stored in the database 906. The supercritical threshold(s) 912 can be used determine identify a fluid flow that is in a substantially supercritical state and/or a near-supercritical state. The supercritical threshold(s) 912 includes one or more threshold values of a temperature and/or pressure of a fluid at which the flow monitor circuitry 910 identifies that fluid as substantially/near-supercritical. In some examples, when the flow monitor circuitry 910 determines that a fluid is in a substantially/near-supercritical state, the flow monitor circuitry 910 may treat the fluid as a supercritical fluid.

In some examples, there are multiple thresholds for the different possible pressures and temperatures. For example, there can be a first (e.g., low) threshold that includes a first threshold temperature and a first threshold pressure, which may be a lowest temperature and pressure at which the fluid may be treated as substantially/near-supercritical. In some examples, a second threshold may identify a second threshold temperature associated with a critical pressure at which the fluid may be treated as substantially/near-supercritical. In some examples, a third threshold may identify a second threshold pressure associated with a critical temperature at which the fluid may be treated as substantially/near-super-critical. In some examples, the supercritical threshold(s) 912 are set prior to and/or during operation based on parameters (e.g., materials utilized, pump 304 design, aircraft 10 design, gas turbine engine 100 design, heat exchange fluid, etc.) associated with the thermal management system 300. The example maximum pressure value can be adjusted relative to the pressure capacities of the thermal transport bus 302, the pump 304, the heat exchangers 306, 308, the bypass conduit (s) 310, and/or the valves 312, 314.

In some examples, the supercritical thresholds 912 iden-tify a range of different charge conditions (e.g., temperature and/or pressure) at which the controller 816 can charge CO2 in an auxiliary reservoir 824 such that the CO2 in the auxiliary reservoir 824 is charged to be substantially/near a supercritical state. For example, the flow monitor circuitry 910 may be configured with different trigger points at which to stop charging the auxiliary reservoir 824. Such trigger points may be determined to prevent the thermal manage-ment system 300 from incurring accelerated wear.

When the flow monitor circuitry 910 determines that the pressure and the temperature of the fluid satisfies a super-critical threshold 912, the flow monitor circuitry 910 may identify the fluid as a supercritical fluid. When the flow monitor circuitry 910 identifies the supercritical fluid, the flow monitor circuitry 910 is configured to direct the super-critical fluid to the recirculation transport bus 806 defining the secondary flowpath 808. When the flow monitor cir-cuitry 910 determines that the pressure and the temperature of the fluid does not satisfy a supercritical threshold 912, the flow monitor circuitry 910 is configured to direct the fluid to the bypass conduit 810 defining the bypass flowpath 812.

In some examples, the flow monitor circuitry 910 is configured to identify a condition (e.g., temperature and/or pressure condition) to move a fluid to a supercritical state. For example, the flow monitor circuitry 910 may identify a temperature at which to heat the fluid to move the fluid to the supercritical state. In some examples, the flow monitor circuitry 910 may identify a pressure to apply to the fluid to move it to a supercritical state. In some examples, the condition is based on the critical values of CO2. In some examples, the condition is based on the supercritical thresh-old(s) 912 such that the condition includes temperature and/or pressure values that move the fluid substantially/near supercritical state.

The controller 816 also includes example flow route manager circuitry 914, which is configured to manage the secondary flowpath 808 and the bypass flowpath 812 during operation of the pump 304, 400, 500, 802. For example, the flow route manager circuitry 914 may cause the first thermal valve 814 and/or the second thermal valve 822 to move between discrete positions based on a temperature of fluid flowing through a respective valve 814, 822. In some examples, the flow route manager circuitry 914 may cause a pressure valve (e.g., pressure valve 1204, 1206, etc.) to move between discrete positions based on a pressure of fluid flowing through a respective valve 1204, 1206. In some examples, the flow route manager circuitry 914 may cause the heater 826 to apply heat to the fluid based on a tem-perature of the fluid (e.g., obtained from a sensor(s) 818 via the interface circuitry 904).

Based on the foregoing the thermal management system 300 may be configured to operate such that fluid that enters a secondary inlet 476, 524 from the recirculation transport bus 806 is in a supercritical state, a substantially critical state, and/or a near-supercritical state.

Figure 10:
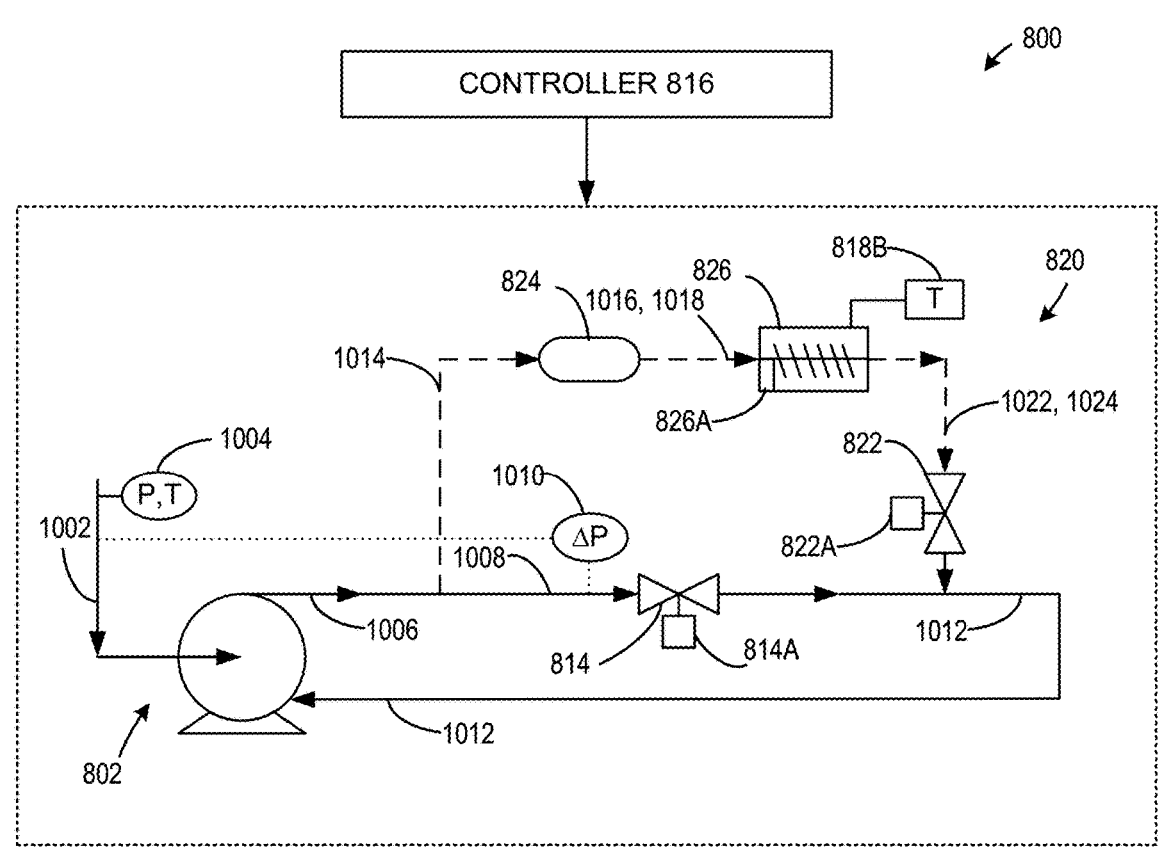
FIG. 10 illustrates an example fluid flow diagram associated with the example secondary flow control system of FIG. 8 in accordance with teachings of this disclosure.

FIG. 10 is a schematic illustration of the example fluid flow diagram of an example secondary flow control system (e.g., secondary flow control system 800 of FIG. 8) struc-tured in accordance with teachings of his disclosure. The example system 800 illustrated in FIG. 10 includes the example controller 816 to determine a state of an example input flow 1002 of CO2 that enters an example pump 802 (e.g., pump 304, 400, 500). For example, the controller 816 may obtain sensor data 1004 (e.g., pressure and temperature measurements) from one or more sensors 818, 818A posi-tioned at a primary inlet 401, 501 of the pump 802.

When the controller 816 determines a corresponding output flow 1006 of CO2 from the pump outlet 480, 580 is associated with a temperature measurement above a critical temperature and a pressure measurement above a critical pressure, indicating the output flow 1006 includes sCO2, the controller 816 actuates the first thermal valve 814 (e.g., via a valve actuator 814A communicatively coupled to the controller 816). This is a steady state condition in which the controller 816 may keep the first thermal valve 814 open until a detection of liquid CO2 in the output flow 1006. When the controller 816 actuates the first thermal valve 814, an sCO2 flow 1008 is driven directly through the secondary flowpath 808 such that sCO2 1012 enters the secondary inlet 476, 524 of the pump 304, 400, 500.

When the temperature and/or the pressure of the input flow 1002 is below a respective critical value, the controller 816 may determine that CO2 in the input flow 1002 is not in a supercritical phase but rather a liquid phase or a gas phase. In such instances, the controller 816 may determine, based on the pressure and temperature measurements of the input flow 1002, a temperature and/or pressure condition needed to move the CO2 to a supercritical state. Based on the determination, the controller 816 may determine that the first thermal valve 814 can move the output flow 1006 to a supercritical state, a substantially supercritical state, and/or a near-supercritical state. In such instances, the controller 816 may actuate the first thermal valve 814 to direct the output flow 1006 through the secondary flowpath 808.

As illustrated in FIG. 10, the output flow 1006 may experience a pressure change 1010 while traveling from the primary inlet 401, 501, through the pump 802, and to the first thermal valve 814. Accordingly, the controller 816 and/or the first thermal valve 814 can adjust a discrete position of the valve 814 to adjust a pressure of the sCO2 flow 1008 to help ensure the sCO2 flow 1008 is at least a near-supercriti-cal state prior to entering the secondary inlet 476, 524.

When the controller 816 determines the output flow 1006 of CO2 is associated with a temperature measurement below a threshold temperature and/or a pressure measurement below a threshold pressure, indicating that the CO2 is in a liquid phase or a gas phase, the controller 816 actuates the example second thermal valve 822 (e.g., via a respective valve actuator 822A communicatively coupled to the con-troller 816). In some examples, the controller 816 causes the first thermal valve 814 to close. When the controller 816 actuates the second thermal valve 822, a corresponding flow 1014 of non-supercritical CO2 is directed to the example bypass circuit (e.g., loop, etc.) 820 via the example bypass conduit 810. In other words, upon determining that the output flow 1006 of working CO2 is not at least a near-supercritical state, the controller 816 actuates the bypass circuit 820 to circumvent a portion of the secondary flow-path 808 and move the flow 1014 of non-supercritical CO2 to at least a near-supercritical state.

When the controller 816 actuates the second thermal valve 822, a pressure differential associated with the example auxiliary reservoir 824 causes a portion of sCO2 1016 held in the auxiliary reservoir 824 to enter the bypass flowpath 812. The portion of sCO2 1016 flows along the bypass conduit 810 and enters the example heater 826. In some examples, such as during start-up, a portion 1018 of CO2 entering the heater 826 may not be sCO2 from the auxiliary reservoir 824, but rather CO2 that sat in a respective portion of the bypass conduit 810 for a period of time, thus decreasing in pressure and/or temperature. In some examples, the controller 816 determines a temperature of the CO2 1016, 1018 that enters the heater 826 (e.g., via another temperature gauge of the fluid sensors 818B, a thermometer in the heater 826, etc.). Based on the temperature of the CO2 1016, 1018 the controller 816 may cause the heater 826 to increase in temperature to cause the CO2 1016, 1018 to increase in temperature (e.g., via a respective actuators 826A). Accordingly, the controller 816 can provide sufficient heat to the CO2 1016, 1018 in the heater 826 to ensure that a flow 1022 of CO2 exiting the heater 826 at least a near-supercritical state. The flow 1022 then passes through the open second thermal valve 822 and re-enters the recirculation transport bus 806.

In some examples, such as during start-up, a portion 1024 of CO2 entering the second thermal valve 822 may not be sCO2 1022 from the heater 826, but rather CO2 that sat in a respective portion of the bypass conduit 810 for a period of time, thus decreasing in pressure and/or temperature. The controller 816 and/or the second thermal valve 822 is configured to adjust a discrete position of the valve 822 to adjust a pressure of the CO2 1022, 1024 to ensure the flow of CO2 1022, 1024 is in a supercritical state prior to entering the secondary inlet 476, 524. As such, the secondary flow control system 800 can ensure that sCO2 1012 enters the secondary inlet 476, 524 of the pump 304, 400, 500. Moreover, the secondary flow control system 800 can ensure that liquid CO2 does not enter the secondary inlet 476, 524.

When a steady state condition is achieved, the controller 816 continues to monitor a condition of CO2 that enters and/or exits the pump 802 based on measured parameters obtained from the one or more sensors 818. Accordingly, the secondary flow control system 800 can control a flow of CO2 that enters a secondary inlet 476, 524 and flows through an inner region(s) of the pump 802.

Figure 11:
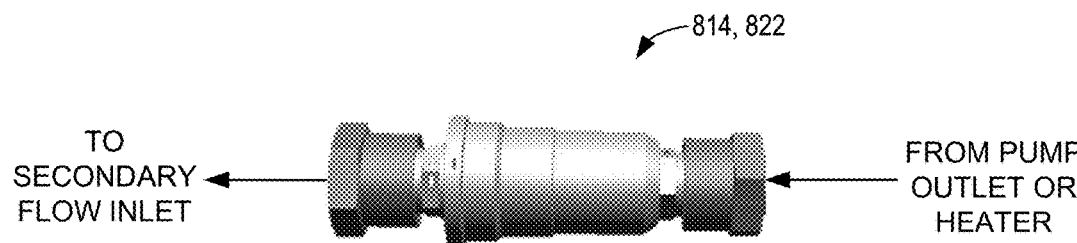
FIG. 11 is an illustration of an example thermal valve that may be used in example secondary flow control systems disclosed herein.

FIG. 11 illustrates an example valve that may be utilized for an example thermal valve (e.g., first thermal valve 814, second thermal valve 822, etc.) that can be utilized in an example secondary flow control system in accordance with teachings of this disclosure. The thermal valve 814, 822 is a thermally activated valve configured to dynamically compensate for varying valve inlet pressures. The thermal valve 814, 822 includes a thermal sensing component to identify a temperature of a given flow. The thermal valve 814, 822 is caused to move between discrete positions (e.g., self-actuated and/or via the controller 816 and a respective actuator 814A, 822A) in response to temperature changes.

In some examples, the thermal valve 814, 814 can be integrated in the recirculation transport bus 806 or the bypass conduit 810, respectively. In some examples, the thermal valve 814, 814 can be mounted non-invasively to the recirculation transport bus 806 or the bypass conduit 810, respectively. The thermal valve 814, 822 thus allows an actuator to be in contact with a fluid flow directly or through thermal conduction to regulate the flow.

FIG. 12 is a schematic illustration of another example fluid flow diagram of another example secondary flow control system 1200 structured in accordance with teachings of his disclosure. The secondary flow control system 1200 of FIG. 12 is coupled to or otherwise integrated with a recirculation of the pump 802 (e.g., the pump 304, a thermal transport bus pump 400, 500, and/or another fluid pump that utilizes a working fluid to lubricate a rotating component during operation). The secondary flow control system 1200 of FIG. 12 is similar to the secondary flow control system 800 of FIG. 8. Thus, the secondary flow control system 1200 of FIG. 12 includes the bypass conduit 810 defining the bypass flowpath 812, the controller 816 to determine a state of an input flow of CO2 (not shown) that enters the pump 802 based on sensor data from one or more sensors 818, 818A (not shown), the example heater 826, and an example thermal valve 814. Further, the controller 816 is configured to direct an output flow 1202 of CO2 based on the state of a corresponding input flow.

The secondary flow control system 1200 of FIG. 12 includes an example first pressure valve 1204 (e.g., pressure control valve) and an example second pressure valve 1206 (e.g., pressure control valve), each of which is fluidly coupled to the bypass conduit 810. As such, each valve 1204, 1206 may be moved (e.g., by the controller 816) between fully and/or partially opened and/or closed positions to selectively occlude the output flow 1202 of CO2 through the bypass conduit 810. The pressure valves 1204, 1206 are actuable flow control structures. The first pressure valve 1204 is positioned adjacent the pump outlet 480, 580 to direct the output flow 1202 of CO2. The second pressure valve 1206 is positioned downstream of the first pressure valve 1204 (e.g., relative to the secondary inlet 476, 524). The first pressure valve 1204 is configured to direct the output flow 1202 of CO2 from the pump outlet 480, 580 to the bypass conduit 810. The second pressure valve 1206 is configured to provide a sCO2 1218 from the bypass flowpath 812 to the secondary inlet 476, 524 of the pump 802. Such a configuration enables a reduction in a number of thermal valve 814, 822 in the secondary flow control system 1200 relative to the secondary flow control system 800 of FIG. 8.

The bypass conduit 810 of the bypass flowpath 812 is fluidly coupled to and extends between the first and second pressure valves 1204, 1206. An example bypass circuit 1210 of the secondary flow control system 1200 of FIG. 12 includes the first pressure valve 1204, an example fluid tank (e.g., CO2 accumulator, etc.) 1212, the heater 826, and the second pressure valve 1206. The fluid tank 1212 is structured to store CO2. As opposed to the auxiliary reservoir 824 of FIG. 8, the fluid tank 1212 does not pressurize the CO2 to move the CO2 to a supercritical state. Accordingly, pressure changes to a fluid flow through the bypass circuit 1210 is provided by the pressure valve(s) 1204, 1206.

The thermal valve 814 is fluidly coupled on the recirculation transport bus 806. Thus, the secondary flowpath 808 includes the thermal valve 814, and operates in a manner as described in relation to FIG. 8.

In FIG. 12, the controller 816 directs the output flow 1202 of CO2 exiting the pump 802 based on the state of the input flow. For example, based on the state of the output flow 1202 of CO2, the controller 816 actuates the first pressure valve 1204 (e.g., via example valve actuator 1204A) to direct the output flow 1202 to the bypass conduit 810 or actuates the thermal valve 814 to direct the output flow 1202 to the recirculation transport bus 806. Further, the controller 816 may determine a pressure and/or temperature condition to move the output flow 1202 to a supercritical state to determine which flowpath 808, 812 to occlude.

When the controller 816 determines the output flow 1202 is associated with a temperature measurement above a critical and/or threshold temperature and a pressure measurement above a critical and/or threshold pressure, indicating output flow 1202 includes sCO2, the controller 816 actuates the pressure valves 1204 to occlude the output flow 1202 through the bypass conduit 810 and actuates the thermal valve 814 to allow flow therethrough. When the thermal valve 814 is open, a sCO2 flow 1214 is driven through the valve 814. In some examples, the valve 814 may include sensors 818 to identify a temperature of the sCO2 flow 1214. Based on the temperature, the thermal valve 814 may selectively actuate to increase a pressure of the sCO2 flow 1214 to ensure that a sCO2 flow 1216 exits the thermal valve 814. Accordingly, the thermal valve 814 of the secondary flowpath 808 can help ensure such that sCO2 1218 enters the secondary inlet 476, 524 of the pump 304, 400, 500.

When the controller 816 determines the output flow 1202 is associated with a temperature measurement below a critical and/or threshold temperature and/or a pressure measurement below a critical and/or threshold pressure, indicating output flow 1202 is in a liquid phase or a gas, the controller 816 actuates the pressure valves 1204, 1206 to allow the output flow 1202 to flow through the bypass circuit 1210. In other words, upon determining that the output flow 1202 of working CO2 is not in a supercritical sate, the controller 816 circumvents a portion of the secondary flowpath 808 to move the flow 1220 of non-supercritical CO2 to the supercritical state.

As the output flow 1202 passes through the first pressure valve 1204, the pressure valve 1204 may dynamically actuate to adjust a pressure of the output flow 1202 and to adjust a pressure of the flow 1220 non-supercritical CO2. Further, the first pressure valve 1204 drives the flow 1220 of sCO2 to the fluid tank 1212. A pressure differential associated with the fluid tank 1212 causes a portion of sCO2 1222 held in the fluid tank 1212 enter the bypass flowpath 812. The portion of sCO2 1222 flows along the bypass conduit 810 and enters the example heater 826. In some examples, such as during start-up, a portion 1224 of CO2 entering the heater 826 may not be sCO2 from the fluid tank 1212, but rather CO2 that sat in a respective portion of the bypass conduit 810 for a period of time, thus decreasing in pressure and/or temperature. In some examples, the controller 816 determines a temperature of the CO2 1222, 1224 that enters the heater 826 (e.g., via another temperature gauge of the fluid sensors 818, a thermometer in the heater 826, etc.). Based on the temperature of the of CO2 1222, 1224 the controller 816 may cause the heater 826 to increase in temperature to cause the CO2 1222, 1224 to increase in temperature. Accordingly, the controller 816 can provide sufficient heat to CO2 1222, 1224 in the heater 826 to ensure that a flow 1226 of CO2 is exiting the heater 826 in a supercritical state.

The flow of sCO2 1226 then flows through the second pressure valve 1206. In some examples, the second pressure valve 1206 detects a pressure of the sCO2 flow 1226 passing through the valve 1206 and selectively pressurizes the sCO2 flow 1226 such that sCO2 1218 enters the secondary inlet 476, 524 of the pump 304, 400, 500. As such, the secondary flow control system 1200 can ensure that liquid CO2 does not enter the secondary inlet 476, 524.

When a steady state condition is achieved, the controller 816 continues to monitor a condition of CO2 that enters and/or exits the pump 802 based on measured parameters obtained from the one or more sensors 818. Accordingly, the secondary flow control system 800 can control a flow of CO2 that enters a secondary inlet 476, 524 and flows through an inner region(s) of the pump 802.

FIG. 13 is a schematic illustration of another example fluid flow diagram of another example secondary flow control system 1300 of FIG. 13 structured in accordance with teachings of his disclosure. The secondary flow control system 1300 of FIG. 13 is coupled to or otherwise integrated with the pump 802 (e.g., the pump 304, a thermal transport bus pump 400, 500, and/or another fluid pump that utilizes a working fluid to lubricate a rotating component during operation). The secondary flow control system 1300 of FIG. 13, which is similar to the secondary flow control systems 800, 1200 of FIGS. 8 and 12, includes the bypass conduit 810 defining the bypass flowpath 812, the example controller 816 to determine a state of an input flow of CO2 (not shown) that enters the pump 802 based on sensor data from one or more sensors 818 (not shown). Further, the controller 816 is configured to direct an output flow 1302 based on the state of the input flow.

The secondary flow control system 1300 of FIG. 13 also includes an example flow control valve 1304 positioned on the recirculation transport bus 806. The flow control valve 1304 is structure to direct a fluid flow through the valve 1304. The flow control valve 1304 may be actuated by the controller 816 (e.g., via an example actuator 1304A). That is, while the flow control valve 1304 is closed, the secondary flowpath 808 is occluded. While the flow control valve 1304 is open, at least a portion of the output flow 1302 can pass through the valve 1304.

The secondary flow control system 1300 includes an example thermal valve 1306. The thermal valve 1306 is similar to the thermal valves 814, 822 of FIG. 8. However, the thermal valve 1306 of FIG. 14 includes two inlet ports. An example first inlet port (e.g., valve inlet) 1306B is fluidly coupled to a downstream end of the bypass conduit 810 and an example second inlet port (e.g., valve inlet) 1306R is fluidly coupled to a portion of recirculation transport bus 806 downstream of the flow control valve 1304. An example outlet port (e.g., valve outlet) 1306O of the thermal valve 1306 is fluidly coupled to a portion of the recirculation transport bus 806 between the flow control valve 1304 and the secondary inlet 476, 524 to the pump 802. Accordingly, the thermal valve 1306 of FIG. 13 includes a single thermal valve 1306 as opposed to the two thermal valves 814, 822 of the secondary flow control system 800 of FIG. 8.

FIG. 13 includes an example bypass circuit 1308, which includes the first pressure valve 1204 on the bypass conduit 810 adjacent the pump outlet 480, 580, the fluid tank 1212, and the example heater 826. Further, the bypass circuit 1308 includes the thermal valve 1306.

The controller 816 is configured to cause the thermal valve 1306 to open the first inlet port 1306B (e.g., to actuate the bypass circuit 1308) or the second inlet port 1306R (e.g., via an example actuator 1306A) based on a state of a fluid flow. In some examples, the thermal valve 1306 is self-actuated. In some examples, the thermal valve 1306 is actuated by the controller 816 via a respective actuator 1306A.

In FIG. 13, the controller 816 directs the output flow 1302 of CO2 exiting the pump 802 based on the state of the input flow. For example, based on the state of the output flow 1302 of CO2, the controller 816 direct the output flow 1302 to bypass flowpath 812 (e.g., by opening the first pressure valve 1204) or to the secondary flowpath 808 (by opening the flow control valve 1304). Further, the controller 816 may determine a pressure and/or temperature condition to move the output flow 1202 to a supercritical state to determine which flowpath 808, 812 to occlude.

When the controller 816 determines the output flow 1302 is associated with a temperature measurement above a critical and/or threshold temperature and a pressure measurement above a critical and/or threshold pressure, indicating output flow 1302 includes $sCO_2$, the controller 816 actuates the pressure valve 1204 to occlude the output flow 1202 through the bypass conduit 810 and actuates the second inlet port 1306R of the thermal valve 1306 to allow flow therethrough. Thus, the controller 816 directs the output flow 1302 through the secondary flowpath 808, which provide an $sCO_2$ flow 1310 to the second inlet port 1306R of the thermal valve 1306. Further, the controller 816 may actuate the first inlet port 1306B to close such that the $sCO_2$ flow 1310 passes through the second inlet port 1306R of the thermal valve 1306 and through the valve outlet 1306O. In some examples, the thermal valve 1306 selectively actuates the valve outlet 1306O based on a temperature of the $sCO_2$ flow 1310 through the valve to adjust a pressure of the $sCO_2$ flow 1310 to ensure that a $sCO_2$ flow 1312 exits the thermal valve 1306. Accordingly, the thermal valve 1306 of the secondary flowpath 808 can help ensure such that $sCO_2$ 1312 enters the secondary inlet 476, 524 of the pump 304, 400, 500.

When the controller 816 determines the output flow 1302 is associated with a temperature measurement below a critical and/or threshold temperature and/or a pressure measurement below a critical and/or threshold pressure, indicating output flow 1302 is in a liquid phase or a gas, the controller 816 actuates the pressure valve 1204 to allow the output flow 1302 to flow through the bypass flowpath 812. In other words, upon determining that the output flow 1302 of working $CO_2$ is not in a supercritical sate, the controller 816 circumvents a portion of the secondary flowpath 808 to move the flow 1314 of non-supercritical $CO_2$ to the supercritical state. Thus, the controller 816 directs the output flow 1302 through the bypass flowpath 812, which provide an $sCO_2$ flow 1312 to the first inlet port 1306B of the thermal valve 1306. Further, the controller 816 actuates the thermal valve 1306 to open the first inlet port 1306B and close the second inlet port 1306R such that the $sCO_2$ flow 1310 passes through the thermal valve 1306 and through the valve outlet 1306O.

Figure 14:
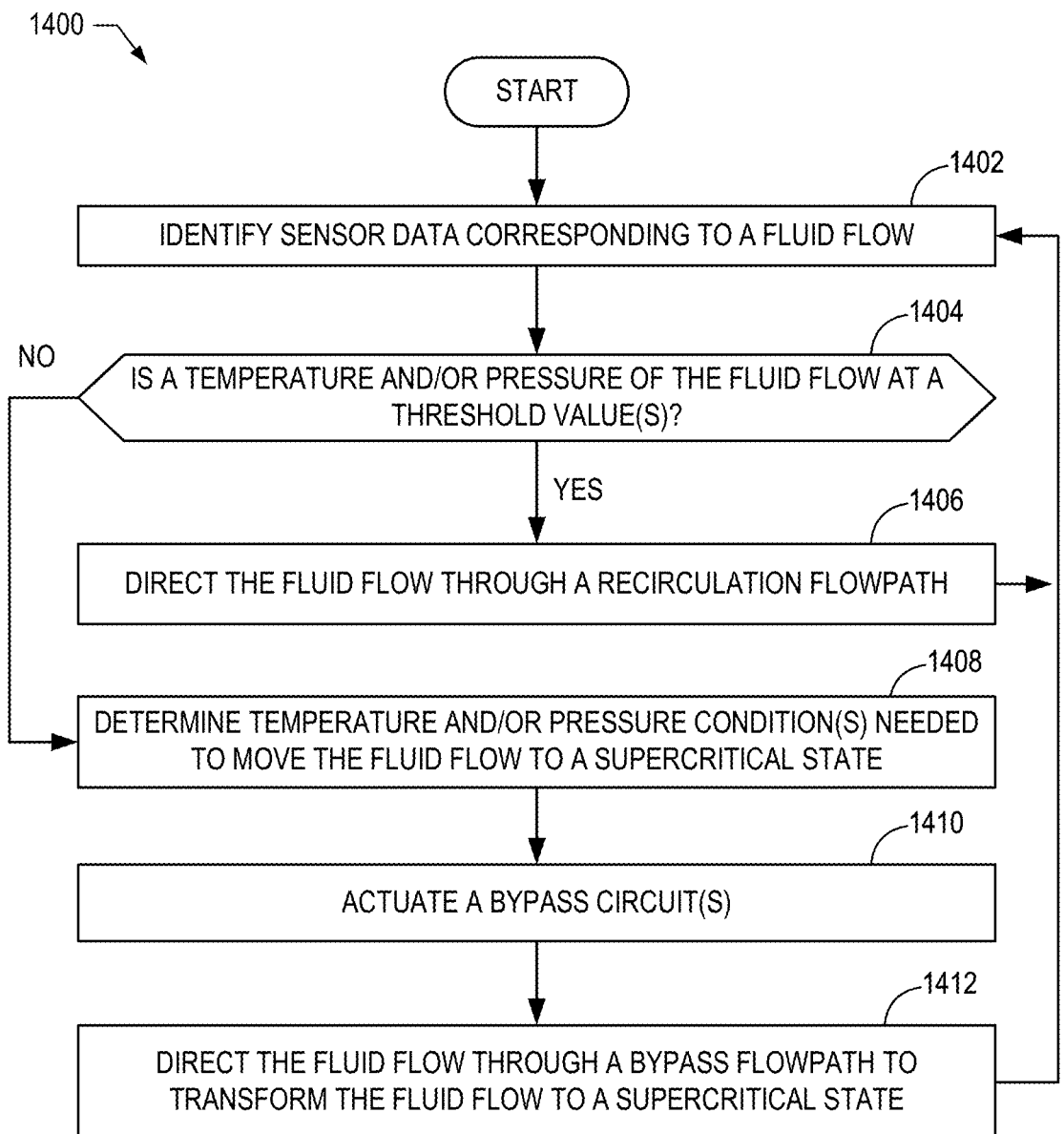
FIG. 14 is a flow diagram of an example process to control a fluid provided to a secondary flow network of a pump.

Flowcharts representative of example machine readable instructions, which may be executed to configure processor circuitry to implement the controller 816 of FIGS. 8-13, is shown in FIGS. 14 and/or 15. The machine readable instructions may be one or more executable programs or portion(s) of an executable program for execution by processor circuitry, such as the processor circuitry 1612 shown in the example processor platform 1600 discussed below in connection with FIG. 16. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 15, many other methods of implementing the example controller 816 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 15 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 14 is a flow diagram of an example process 1400 to control or otherwise direct a flow of a working fluid (e.g., a heat exchange fluid, carbon dioxide, etc.) to a secondary flow network. The process 1400 beings at start-up of an aircraft 10, turbine engine 100, and/or another machine that causes start-up of an example pump 304, 400, 500, 802. At block 1402, the process includes identifying sensor data corresponding to a fluid flow. For example, as a heat exchange fluid flows into the pump 304, 400, 500, 802, one or more sensors 818 measure the pressure and temperature of the fluid flow. The sensors 818 can transmit the sensor data to the example controller 816, which obtains the sensor data. In some examples, the sensors 818 are transducers that send an electrical signal to the controller 816, which computes the flow pressure and temperature of the heat exchange fluid. In other examples, the sensors 818 can be venturis, thermocouples, etc., that measure characteristics of the heat exchange fluid to be processed by the controller 816.

At block 1404, the process includes determining whether a temperature and/or a pressure of the fluid flow is at a threshold value(s). For example, the controller 816 may compare the temperature and/or the pressure of the fluid flow to a respective threshold(s) value to identify a state of the fluid in the fluid flow. In some examples, the threshold value is a critical value (e.g., a critical temperature and/or a critical pressure) of the fluid. In some examples, the threshold value(s) is within a 5% range of the respective critical value(s). In some examples, the threshold value(s) is another value(s) defined in a database (e.g., database 906) that may be provided by a machine or human. When the temperature and/or a pressure of the fluid flow is at a threshold value(s), the process advances to block 1406. When the temperature and/or a pressure of the fluid flow is not at a threshold value(s), the process advances to block 1408.

At block 1406, the process includes directing the fluid flow through a secondary flowpath 808. For example, the controller 816, in response to identifying the fluid as at or above a threshold state, can actuate a valve on the recirculation transport bus 806 to cause the fluid flow to flow through the recirculation transport bus 806 defining the secondary flowpath 808. In some examples, the controller 816 causes the first thermal valve 814 to open and/or the second thermal valve 822 to close. In some examples, the controller causes the first thermal valve 814 to open and/or the first and second pressure valves 1204, 1206 to close. In some examples, the controller 816 causes the flow control valve 1304 and the second inlet port 1306R to open and/or the first pressure valve 1204 and the first inlet port 1306B to close. The process then returns to block 1402 at which the controller 816 continues to identify sensor data.

At block 1408, the process includes determining a pressure and/or temperature condition to achieve a substantially supercritical state (e.g., threshold state) of the fluid flow. For example, based on the measured temperature and/or pressure of the fluid flow corresponding to the sensor data, the controller can determine a temperature and/or pressure to apply to the fluid in the fluid flow that would move the fluid to a substantially supercritical state.

At block 1410, the process includes actuating a bypass circuit 820, 1210, 1308. For example, the controller 816 may cause the heater 826 to increase in temperature and/or the auxiliary reservoir 824 or the fluid tank 1212 to increase in pressure.

At block 1412, the process includes directing the fluid flow through a bypass flowpath 812 to transform the fluid flow to a substantially supercritical state. For example, the controller 816, can actuate a valve on the bypass conduit 810 to cause the fluid flow to flow through the bypass conduit 810 defining the bypass flowpath 812. In some examples, the controller 816 causes the second thermal valve 822 to open and/or the first thermal valve 814 to close. In some examples, the controller causes the first and second pressure valves 1204, 1206 to open and/or the first thermal valve 814 to close. In some examples, the controller 816 causes the first pressure valve 1204 and the first inlet port 1306B to open and/or the flow control valve 1304 and the second valve inlet 1306R to close. Thus, the fluid flow can flow through the bypass flowpath 812 towards the secondary inlet 476, 524. The process then returns to block 1402 at which the controller 816 continues to identify sensor data.

Figure 15:
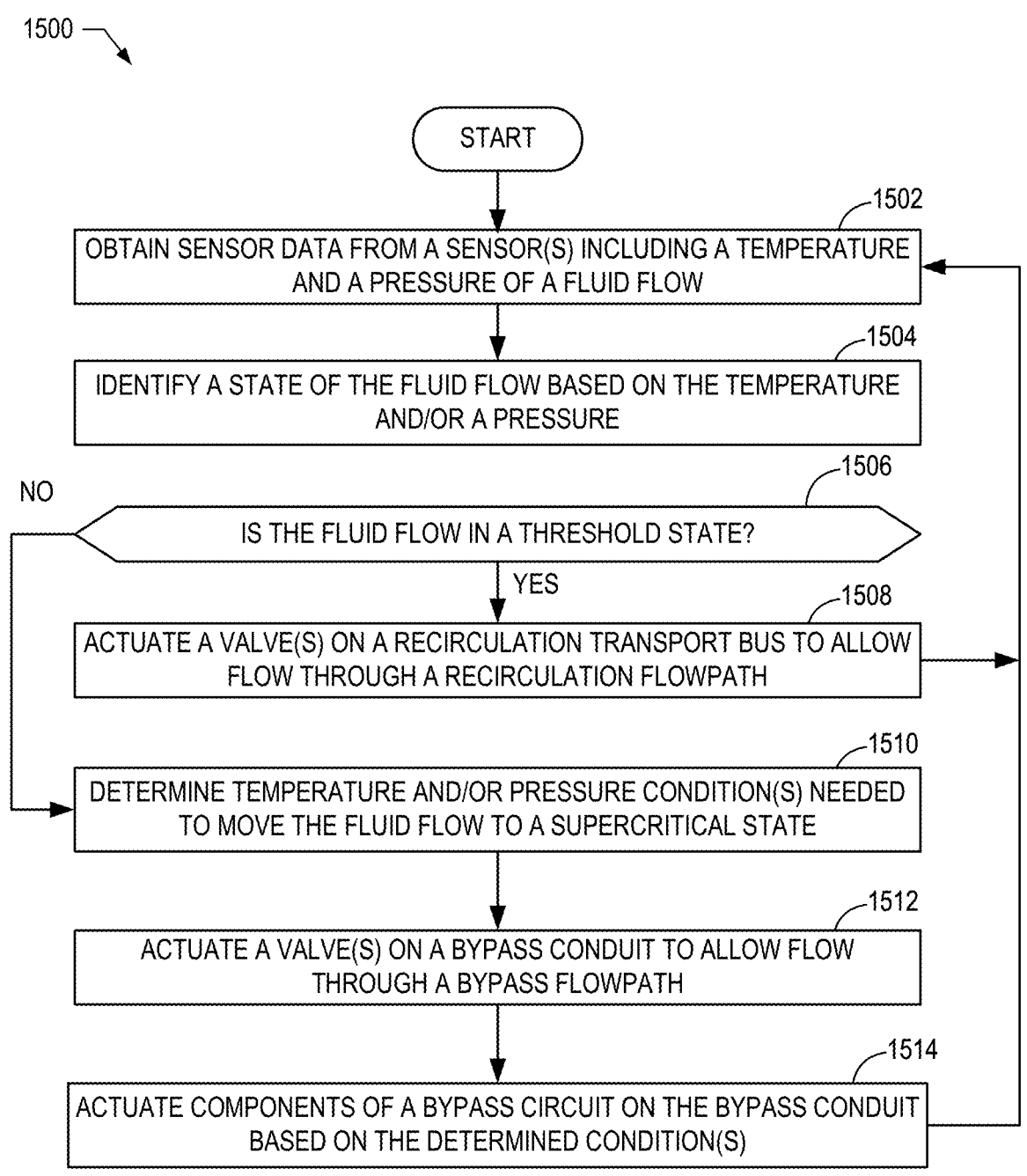
FIG. 15 is flowchart representative of example machine readable instructions and/or example operations that may be executed by example processor circuitry to implement the example secondary flow control system(s) of FIGS. 8-10, 11, and/or 12.

FIG. 15 is a flowchart representative of example machine readable instructions and/or example operations 1500 that may be executed and/or instantiated by processor circuitry to control a fluid that flows into a secondary inlet of a fluid pump to provide a pressurized fluid to one or more rotating components of the fluid pump. The machine readable instructions and/or the operations 1500 of FIG. 15 begin at block 1502, at which the controller 816 obtains sensor data from a sensor(s) including a temperature and a pressure of a fluid flow. For example, the controller 816 may be communicatively coupled to the one or more sensors 818 For example, the controller 816 may obtain sensor data (e.g., via the interface circuitry 904) corresponding to the fluid flow that passes an example sensor 818A to obtain a temperature and a pressure of the fluid.

At block 1504, the flow monitor circuitry 910 identifies a state of the fluid flow based on the temperature and/or the pressure of the fluid flow. For example, the flow monitor circuitry 910 may compare the temperature and pressure measurements to an critical temperature and a critical pressure of the fluid, respectively. In some examples, the flow monitor circuitry 910 may compare the temperature and pressure measurements to example supercritical thresholds 912 to determine whether the fluid flow is in a substantially/near supercritical state.

At block 1506, the flow monitor circuitry 910 identifies whether the fluid flow is in a threshold state. For example, the fluid flow may be in a near-supercritical state and/or a substantially critical state. When the flow monitor circuitry 910 determines that the fluid flow is in a supercritical and/or substantially/near-supercritical state, the controller 816 actuates a valve(s) (e.g., first thermal valve 814, first pressure valve 1204, second pressure valve 1206, flow control valve 1304, and/or thermal valve 1306) on the recirculation transport bus 806 to allow flow along the secondary flowpath 808 (block 1508). Control then returns to block 1502. Accordingly, the secondary flow control system 800, 1200, 1300 can continue to ensure that liquid fluid flow does not enter the secondary inlet 476, 524.

When the flow monitor circuitry 910 determines that the fluid flow is in a liquid state, control advances to block 1510 at which the flow monitor circuitry 910 determines a pressure and/or temperature condition to move to the fluid flow to a supercritical and/or substantially/near-supercritical state. At block 1512, the example flow monitor circuitry 910 actuates a valve(s) (e.g., second thermal valve 822, first pressure valve 1204, second pressure valve 1206, and/or thermal valve 1306) on a bypass conduit 810 to allow flow through a bypass flowpath 812. At block 1514, the example flow route manager circuitry 914 actuates components (e.g., a heater 826, second thermal valve 822, first pressure valve 1204, second pressure valve 1206, and/or thermal valve 1306, etc.) of a bypass circuit 820, 1210 on the bypass conduit 810 based on the determined condition(s). Control then returns to block 1502. Accordingly, the secondary flow control system 800, 1200, 1300 can continue to ensure that liquid fluid flow does not enter the secondary inlet 476, 524.

Figure 16:
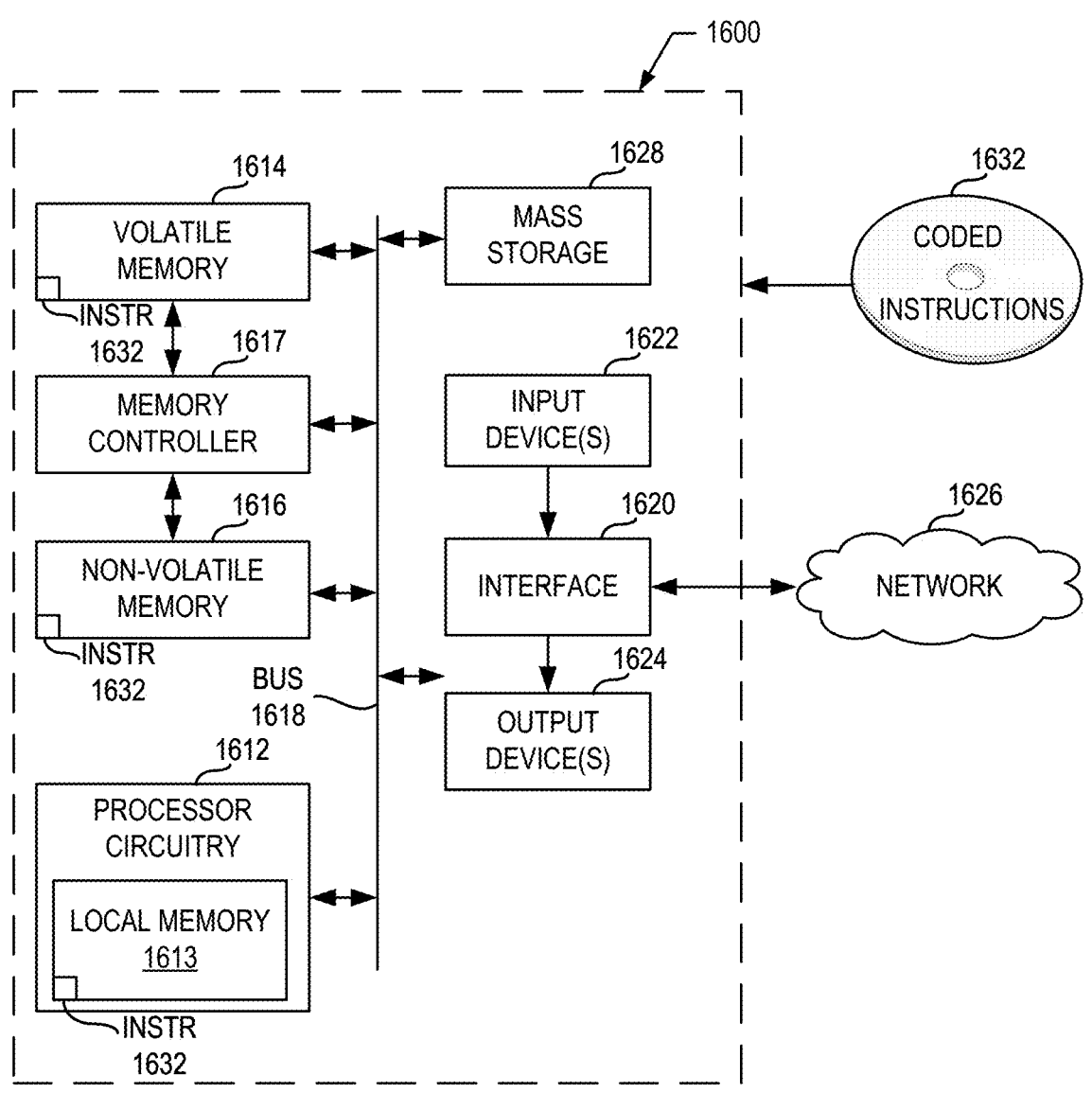
FIG. 16 is a block diagram of an example processing platform including processor circuitry structured to execute the example machine readable instructions and/or the example operations of FIG. 15 to implement the example secondary flow control system(s) FIG. 8-10, 11, and/or 12.

FIG. 16 is a block diagram of an example processor platform 1600 structured to execute and/or instantiate the machine readable instructions and/or the operations of FIGS. 14 and/or 15 to implement the secondary flow control system 800, 1200, 1300 of FIGS. 8-10, 12, and/or 13. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs, microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements the example controller 816.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output device(s) 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1632, which may be implemented by the machine readable instructions of FIGS. 14 and/or 15, may be stored in the mass storage device 1628, in the volatile memory 1614, in the non-volatile memory 1616, and/or on a removable non-transitory computer readable storage medium such as a CD or DVD.

From the foregoing, it will be appreciated that example methods, systems, and apparatus have been disclosed to provide a supercritical fluid to a secondary flow network in closed loop systems are disclosed herein. Supercritical CO2 pump uses gas foil bearings. Impeller & bearings are designed with the consideration of supercritical phase of CO2. Any presence of liquid during startup adversely effects the foil bearing performance (windage loss, film thickness/stiffness, etc.). The present disclosure ensures liquid CO2 elimination inside the pump during start & does not enter inlet of impeller. This is achieved by secondary circuit to create pressure and temperature conditions to convert CO2 into supercritical state prior to startup. This protects gas foil bearings. Further aspects of the present disclosure are provided by the subject matter of the following clauses:

Example 1 includes a flow control system to provide a pressurized lubricant to a secondary flow network disposed within a fluid pump, the flow control system comprising sensors to measure parameters of a fluid corresponding to a fluid flow; a recirculation loop fluidly coupled to a secondary inlet of the fluid pump, the recirculation loop to provide a first flowpath, wherein the secondary inlet is an inlet to the secondary flow network; a bypass circuit fluidly coupled to the secondary inlet, the bypass circuit to provide a second flowpath; and a controller to direct the fluid flow to the first flowpath or the second flowpath based on sensor data from the sensor, the sensor data indicative of a state of the fluid.

Example 2 includes the flow control system of example 1, wherein the sensors include first sensors positioned adjacent a primary inlet of the fluid pump, the first sensors including a first temperature sensor and a first pressure sensor.

Example 3 includes the flow control system of any preceding clause, wherein the recirculation loop includes: a first conduit defining the first flowpath, the first conduit fluidly coupled between an outlet of the fluid pump and the secondary inlet; and a first valve fluidly coupled to the conduit.

Example 4 includes the flow control system of any preceding clause, wherein the controller actuates the first valve to direct the fluid flow to the first flowpath.

Example 5 includes the flow control system of any preceding clause, wherein the first valve a thermally activated valve configured to dynamically actuate based on at least one of a temperature the fluid flow and a pressure of the fluid flow.

Example 6 includes the flow control system of any preceding clause, wherein the bypass circuit includes: a second conduit defining the second flowpath, wherein the second conduit is fluidly coupled to the secondary inlet via a downstream region of the recirculation loop; an auxiliary reservoir fluidly coupled to the second conduit; a heater fluidly coupled to the second conduit, the heater disposed upstream relative to the auxiliary reservoir; and a second valve fluidly coupled to the second conduit, the second valve disposed upstream relative to the auxiliary reservoir.

Example 7 includes the flow control system of any preceding clause, wherein the controller actuates the second valve to direct the fluid flow to the second flowpath.

Example 8 includes the flow control system of any preceding clause, wherein the auxiliary reservoir is to retain a portion of the fluid, the portion to be in at least a near-supercritical state, and wherein the auxiliary reservoir is associated with a pressure differential to cause the portion of the fluid to flow into the second conduit when the second valve actuates.

Example 9 includes a fluid pump to pressurize a fluid in a closed loop system, the fluid pump comprising a pump housing including a primary inlet, a secondary inlet, and an outlet; a recirculation transport bus fluidly coupled between the outlet and the secondary inlet, the recirculation transport bus including a first valve to control flow through the recirculation bus; and a bypass conduit fluidly coupled to the recirculation transport bus to circumvent a portion of the recirculation transport bus, the bypass conduit including a bypass circuit to move a flow fluid towards a supercritical state, wherein the fluid flow includes a portion of the pressurized fluid.

Example 10 includes the fluid pump of example 9, wherein the bypass circuit includes: a pressure tank structured to store another portion of the pressurized fluid in at least a near-supercritical state; a fluid heater configured to transmit heat to the fluid flow; and a second valve to control flow through the bypass conduit, the second valve to actuate based on a parameter of the fluid flow, the pressure tank to bleed other portion of the pressurized fluid to the bypass conduit in response to actuation of the second valve.

Example 11 includes the fluid pump of any preceding clause, wherein at least one of the first valve or the second valve is a thermally activated valve configured to actuate between discrete positions based on a temperature of the fluid flow through the respective valve.

Example 12 includes the fluid pump of any preceding clause, wherein the fluid heater is positioned upstream of the pressure tank to control a temperature of the fluid flow through the bypass conduit.

Example 13 includes an apparatus comprising interface circuitry to obtain sensor data corresponding a flow of fluid; at least one memory; machine readable instructions; and processor circuitry to execute the machine readable instructions to determine a state of the fluid based on the sensor data; determine, based on the state of the fluid, whether to direct the fluid to a first flowpath corresponding to a recirculation conduit or a second flowpath corresponding to a bypass conduit; and in response to determining to direct the fluid to the second flowpath, actuate a bypass circuit to move the fluid to change the state of the fluid.

Example 14 includes the apparatus of example 13, wherein the sensor data includes a pressure and a temperature of the fluid, and wherein the processor circuitry executes the machine readable instructions to determine the state of the fluid by comparing the sensor data to a critical temperature of the fluid and a critical pressure of the fluid, the critical temperature and the critical value to identify a near-supercritical state of the fluid.

Example 15 includes the apparatus of any preceding clause, wherein at least one of the temperature or the pressure is below respective one of the critical temperature and the critical pressure, the processor circuitry executes the machine readable instructions to compare the sensor data to a threshold temperature of the fluid and a threshold pressure of the fluid, the threshold temperature and the threshold value to identify a near-supercritical state of the fluid.

Example 16 includes the apparatus of any preceding clause, wherein the fluid is in the supercritical state or the near-supercritical state, the processor circuitry executes the machine readable instructions to determine to direct the fluid to the first flowpath corresponding to the recirculation conduit.

Example 17 includes the apparatus of any preceding clause, wherein the fluid is in one of a gas state or a liquid state, and wherein the processor circuitry executes the machine readable instructions to determine to direct the fluid to the second flowpath.

Example 18 includes the apparatus of any preceding clause, wherein the bypass circuit includes a heater having a heater actuator, and the processor circuitry is to actuate the bypass circuit by executing the machine readable instructions to cause the heater to increase in temperature by transmitting a signal to the heater actuator.

Example 19 includes the apparatus of any preceding clause, wherein the bypass circuit includes a thermal valve having a valve actuator, and the processor circuitry is to actuate the bypass circuit by executing the machine readable instructions to cause the thermal valve to open by transmitting a signal to the valve actuator.

Example 20 includes the apparatus of any preceding clause, wherein the bypass circuit includes an auxiliary reservoir to store a supercritical fluid, the auxiliary reservoir associated with a pressure differential, and wherein the opening of the thermal valve causes the pressure differential to force the supercritical fluid to flow into the bypass conduit.

Example 21 includes at least one computer readable storage medium comprising instructions that, when executed, cause processor circuitry to at least determine a state of a fluid of a low based on sensor data obtained from sensors;

determine, based on the state of the fluid, whether to direct the fluid to a first flowpath corresponding to a recirculation conduit or a second flowpath corresponding to a bypass conduit; and in response to determining to direct the fluid to the second flowpath, actuate a bypass circuit to move the fluid to change the state of the fluid.

Example 22 includes the at least one computer readable storage medium of example 21, wherein the sensor data includes a pressure and a temperature of the fluid, and wherein the instructions, when executed, cause the processor circuitry to determine the state of the fluid by comparing the sensor data to a critical temperature of the fluid and a critical pressure of the fluid, the critical temperature and the critical value to identify a near-supercritical state of the fluid.

Example 23 includes the at least one computer readable storage medium of any preceding clause, wherein at least one of the temperature or the pressure is below respective one of the critical temperature and the critical pressure, the instructions, when executed, are to cause the processor circuitry to compare the sensor data to a threshold temperature of the fluid and a threshold pressure of the fluid, the threshold temperature and the threshold value to identify a near-supercritical state of the fluid.

Example 24 includes the at least one computer readable storage medium of any preceding clause, wherein the fluid is in the supercritical state or the near-supercritical state, the instructions, when executed, are to cause the processor circuitry to determine to direct the fluid to the first flowpath corresponding to the recirculation conduit.

Example 25 includes the at least one computer readable storage medium of any preceding clause, wherein the fluid is in one of a gas state or a liquid state, and wherein the instructions, when executed, cause the processor circuitry to determine to direct the fluid to the second flowpath.

Example 26 includes the at least one computer readable storage medium of any preceding clause, wherein the bypass circuit includes a heater having a heater actuator, and the instructions, when executed, are to cause the processor circuitry to actuate the bypass circuit by transmitting a signal to the heater actuator, the heater actuator to increase a temperature of the heater.

Example 27 includes the at least one computer readable storage medium of any preceding clause, wherein the bypass circuit includes a thermal valve having a valve actuator, and the instructions, when executed, cause the processor circuitry to actuate the bypass circuit by transmitting a signal to the valve actuator, the valve actuator to open thermal valve.

Example 28 includes the at least one computer readable storage medium of any preceding clause, wherein the bypass circuit includes an auxiliary reservoir to store a supercritical fluid, the auxiliary reservoir associated with a pressure differential, and wherein the opening of the thermal valve causes the pressure differential to force the supercritical fluid to flow into the bypass conduit.

Example 29 includes a method comprising determining, by executing at least one instruction with at least one processor, a state of a fluid of a low based on sensor data obtained from sensors; determining, by executing the at least one instruction with the at least one processor, whether to direct the fluid to a first flowpath corresponding to a recirculation conduit or a second flowpath corresponding to a bypass conduit based on the state of the fluid; and in response to determining to direct the fluid to the second flowpath, actuating, by executing the at least one instruction with the at least one processor, a bypass circuit to move the fluid to change the state of the fluid.

Example 22 includes the method of example 21, wherein the sensor data includes a pressure and a temperature of the fluid, and wherein the determining of the state of the fluid includes comparing the sensor data to a critical temperature of the fluid and a critical pressure of the fluid, the critical temperature and the critical value to identify a near-supercritical state of the fluid.

Example 23 includes the method of any preceding clause, wherein at least one of the temperature or the pressure is below respective one of the critical temperature and the critical pressure, the method further including comparing the sensor data to a threshold temperature of the fluid and a threshold pressure of the fluid, the threshold temperature and the threshold value to identify a near-supercritical state of the fluid.

Example 24 includes the method of any preceding clause, wherein the fluid is in the supercritical state or the near-supercritical state, and wherein the determining of the direction of the fluid includes determining to direct the fluid to the first flowpath corresponding to the recirculation conduit.

Example 25 includes the method of any preceding clause, wherein the fluid is in one of a gas state or a liquid state, and wherein the determining of the direction of the fluid includes determining to direct the fluid to the second flowpath.

Example 26 includes the method of any preceding clause, wherein the bypass circuit includes a heater having a heater actuator, and wherein the actuating of the bypass circuit by transmitting a signal to the heater actuator, the heater actuator to increase a temperature of the heater.

Example 27 includes the method of any preceding clause, wherein the bypass circuit includes a thermal valve having a valve actuator, and wherein the actuating of the bypass circuit includes transmitting a signal to the valve actuator, the valve actuator to open thermal valve.

Example 28 includes the method of any preceding clause, wherein the bypass circuit includes an auxiliary reservoir to store a supercritical fluid, the auxiliary reservoir associated with a pressure differential, and wherein the opening of the thermal valve causes the pressure differential to force the supercritical fluid to flow into the bypass conduit.

The following claims are hereby incorporated into this Detailed Description by this reference. Although certain example methods, systems, and apparatus have been disclosed herein, the scope of coverage of this patent is not limited thereto. On the contrary, this patent covers all methods, systems, and apparatus, fairly falling within the scope of the claims of this patent.

What is claimed is:

1. A flow control system to provide a pressurized lubricant to a secondary flow network disposed within a fluid pump, the flow control system comprising:
   sensors to measure parameters of a fluid corresponding to a fluid flow;
   a recirculation loop fluidly coupled to a secondary inlet of the fluid pump, the recirculation loop to provide a first flowpath, wherein the secondary inlet is an inlet to the secondary flow network;
   a bypass circuit fluidly coupled to the secondary inlet, the bypass circuit to provide a second flowpath, the bypass circuit including an auxiliary reservoir to retain a portion of the fluid, the portion of the fluid to be in at least a near-supercritical state; and
   a controller to direct the fluid flow to the first flowpath or the second flowpath based on sensor data from the sensors, the sensor data indicative of a state of the fluid corresponding to the fluid flow.

2. The flow control system of claim 1, wherein the sensors include first sensors positioned adjacent a primary inlet of the fluid pump, the first sensors including a first temperature sensor and a first pressure sensor.

3. The flow control system of claim 1, wherein the recirculation loop includes:
   a first conduit defining the first flowpath, the first conduit fluidly coupled between an outlet of the fluid pump and the secondary inlet; and
   a first valve fluidly coupled to the first conduit.

4. The flow control system of claim 3, wherein the controller actuates the first valve to direct the fluid flow to the first flowpath.

5. The flow control system of claim 3, wherein the first valve is a thermally activated valve configured to dynamically actuate based on at least one of a temperature or a pressure of the fluid flow.

6. The flow control system of claim 1, wherein the bypass circuit includes:
   a second conduit defining the second flowpath, wherein the second conduit is fluidly coupled to the secondary inlet via a downstream region of the recirculation loop, wherein the auxiliary reservoir is fluidly coupled to the second conduit;
   a heater fluidly coupled to the second conduit, the heater disposed downstream relative to the auxiliary reservoir; and
   a second valve fluidly coupled to the second conduit, the second valve disposed downstream relative to the auxiliary reservoir.

7. The flow control system of claim 6, wherein the controller actuates the second valve to direct the fluid flow to the second flowpath.

8. The flow control system of claim 7, wherein the auxiliary reservoir is associated with a pressure differential to cause the portion of the fluid to flow into the second conduit when the second valve actuates.

9. The flow control system of claim 8, wherein the controller is to:
   determine a temperature of carbon dioxide entering the heater based on outputs of a sensor associated with the heater; and
   control operation of the heater based on the temperature.

10. The flow control system of claim 9, wherein at least a portion of the carbon dioxide enters the heater from a portion of the bypass circuit different than the auxiliary reservoir.

11. The flow control system of claim 7, wherein the second valve is a thermally actuated valve.

12. A fluid pump to pressurize a fluid in a closed loop system, the fluid pump comprising:
   a pump housing including a primary inlet, a secondary inlet, and an outlet;
   a recirculation transport bus fluidly coupled between the outlet and the secondary inlet, the recirculation transport bus including a first valve to control flow through the recirculation transport bus; and
   a bypass conduit fluidly coupled to the recirculation transport bus to circumvent a portion of the recirculation transport bus, the bypass conduit including a bypass circuit to move a fluid flow towards a supercritical state, wherein the fluid flow includes a portion of the pressurized fluid and the bypass circuit includes a pressure tank structured to store another portion of the pressurized fluid in at least a near-supercritical state.

13. The fluid pump of claim 12, wherein the bypass circuit includes:
   a fluid heater configured to transmit heat to the fluid flow; and
   a second valve to control flow through the bypass conduit, the second valve to actuate based on a parameter of the fluid flow, the pressure tank to bleed the other portion of the pressurized fluid to the bypass conduit in response to actuation of the second valve.

14. The fluid pump of claim 13, wherein at least one of the first valve or the second valve is a thermally activated valve configured to actuate between discrete positions based on a temperature of the fluid flow through the respective valve.

15. The fluid pump of claim 13, wherein the fluid heater is positioned downstream of the pressure tank to control a temperature of the fluid flow through the bypass conduit.

16. The fluid pump of claim 13, wherein the pressure tank is associated with a pressure differential to cause the other portion of the fluid to enter the bypass conduit in response to actuation of the second valve.

17. The fluid pump of claim 13, further including a sensor to measure a temperature of carbon dioxide entering the fluid heater, the fluid heater to increase in temperature based on the sensor measurement.

18. A flow control system to provide a working fluid to a secondary flow network disposed within a fluid pump, the flow control system comprising:
   the fluid pump including the secondary flow network and a secondary inlet being an inlet to the secondary flow network;
   sensors to measure parameters of a fluid corresponding to a flow of the working fluid;
   a recirculation loop including the secondary flow network, the recirculation loop to provide a first flowpath;
   a bypass circuit fluidly coupled to the secondary inlet to provide a second flowpath;

one or more valves to direct the working fluid to the first flowpath or the second flowpath; and a controller to control the one or more valves to direct the flow of the working fluid to the first flowpath or the second flowpath based on sensor data from the sensors, the sensor data indicative of a state of the working fluid, wherein the controller is configured to direct the working fluid to the first flowpath when the sensor data indicate that the working fluid is in or near a supercritical state.

* * * * *